(12) United States Patent
Theberge et al.

(10) Patent No.: US 11,813,605 B2
(45) Date of Patent: Nov. 14, 2023

(54) FLUID TRANSFER SYSTEM FOR APPLICATIONS INCLUDING STABILIZING BIOLOGICAL FLUIDS

(71) Applicant: University of Washington, Seattle, WA (US)

(72) Inventors: Ashleigh Brooks Theberge, Seattle, WA (US); Erwin Stefan Peter Berthier, Seattle, WA (US); Amanda Haack, Seattle, WA (US); Dakota Kennedy, Seattle, WA (US); Fang Yun Lim, Seattle, WA (US)

(73) Assignee: University of Washington, Seattle, WA (US)

( * ) Notice: Subject to any disclaimer, the term of this patent is extended or adjusted under 35 U.S.C. 154(b) by 312 days.

(21) Appl. No.: 17/361,322

(22) Filed: Jun. 29, 2021

(65) Prior Publication Data
US 2021/0402406 A1 Dec. 30, 2021

Related U.S. Application Data

(60) Provisional application No. 63/046,561, filed on Jun. 30, 2020.

(51) Int. Cl.
*C12N 15/10* (2006.01)
*B01L 3/00* (2006.01)
(Continued)

(52) U.S. Cl.
CPC .............. *B01L 3/567* (2013.01); *B01L 3/021* (2013.01); *B01L 3/50273* (2013.01);
(Continued)

(58) Field of Classification Search
CPC ...... B01L 3/567; B01L 3/021; B01L 3/50273; B01L 3/502738; B01L 3/523;
(Continued)

(56) References Cited

U.S. PATENT DOCUMENTS

| 5,833,674 A | 11/1998 | Turnbull |
| 6,260,590 B1 | 7/2001 | Ziegmann |

(Continued)

FOREIGN PATENT DOCUMENTS

| CN | 105377087 A | 3/2016 |
| CN | 106764222 A | 5/2017 |

(Continued)

OTHER PUBLICATIONS

Bender, et al., "Enzymatic and Chemical-Based Methods to Inactivate Endogenous Blood Ribonucleases for Nucleic Acid Diagnostics," The Journal of Molecular Diagnostics, vol. 22, No. 8, 2020, pp. 1030-1040.

(Continued)

*Primary Examiner* — Jennifer Wecker
*Assistant Examiner* — Oyeleye Alexander Alabi
(74) *Attorney, Agent, or Firm* — Lee & Hayes, P.C.

(57) ABSTRACT

A sample vessel includes a biological sample container and a sample stabilizer container. The biological sample container is configured to receive a biological sample and to store the biological sample. The sample stabilizer container is configured to contain a stabilizer associated with the biological sample. The sample stabilizer container is assembled from a stabilizer vial, an adaptor, and a fluid channel. The stabilizer vial is configured to store an amount of the stabilizer. The adaptor is configured to secure the biological sample container and the stabilizer vial such that the biological sample container and the stabilizer vial form the sample vessel. The fluid channel extends through the adaptor from the stabilizer vial to the biological sample container, the biological sample moving from the biological sample container into the stabilizer vial through the fluid channel.

10 Claims, 6 Drawing Sheets

(51) Int. Cl.
*G01N 35/10* (2006.01)
*B01L 3/02* (2006.01)

(52) U.S. Cl.
CPC ......... *B01L 3/502738* (2013.01); *B01L 3/523* (2013.01); *B01L 3/527* (2013.01); *G01N 35/1002* (2013.01); *B01L 2200/141* (2013.01); *B01L 2200/16* (2013.01); *B01L 2300/042* (2013.01); *B01L 2300/049* (2013.01); *B01L 2400/0415* (2013.01); *B01L 2400/0622* (2013.01)

(58) Field of Classification Search
CPC ............... B01L 3/527; B01L 2200/141; B01L 2200/16; B01L 2300/042; B01L 2300/049; B01L 2400/0415; B01L 2400/0622; B01L 3/5082; B01L 2300/0832; B01L 2300/161; B01L 2400/0688; G01N 35/1002; G01N 1/38
See application file for complete search history.

(56) References Cited

U.S. PATENT DOCUMENTS

| | | | |
|---|---|---|---|
| 6,418,987 B1 | 7/2002 | Colasacco | |
| 7,507,227 B2 | 3/2009 | Fangrow | |
| 10,029,903 B1* | 7/2018 | White | B67C 9/00 |
| 10,494,153 B2 | 12/2019 | Meyer | |
| 2007/0260212 A1 | 11/2007 | Coifman | |
| 2010/0089494 A1 | 4/2010 | Brady | |
| 2012/0265163 A1 | 4/2012 | Cheng | |
| 2014/0318665 A1 | 10/2014 | Balembois | |
| 2018/0297193 A1 | 10/2018 | Garfield | |

FOREIGN PATENT DOCUMENTS

| | | |
|---|---|---|
| IN | 5149CH2013 A | 8/2015 |
| KR | 20180035499 A | 4/2018 |

OTHER PUBLICATIONS

Blicharz, et al., "Microneedle-based device for the one-step painless collection of capillary blood samples," Nature Biomedical Engineering, vol. 2, 2018, pp. 151-157.
Catala, et al., "Quantitative metabolomics comparison of traditional blood draws and TAP capillary blood collection," Metabolomics, vol. 14, 2018, 9 pages.
Combs and Eisen, "Low-cost, low-input RNA-seq protocols perform nearly as well as high-input protocols," Peer J, vol. 3, 2015, 15 pages.
Crossley, et al., "Dried-Blood Spot Screening for Cystic Fibrosis in the Newborn," The Lancet, vol. 313, No. 8114, 1979, pp. 472-474.
Duale, et al., "Human blood RNA stabilization in samples collected and transported for a large biobank," BMC Research Notes, vol. 5, No. 510, 2012, 9 pages.
Fedoruk, Matthew N., "Virtual drug testing: redefining sample collection in a global pandemic," Bioanalysis, vol. 12, No. 11, 2020, pp. 715-718.
Gaissmaier, et al., "Therapeutic drug monitoring in dried blood spots using liquid microjunction surface sampling and high resolution mass spectrometry," Royal Society of Chemistry, vol. 141, 2016, pp. 892-901.
Gautam, et al., "Investigating gene expression profiles of whole blood and peripheral blood mononuclear cells using multiple collection and processing methods," PLOS ONE, vol. 14, No. 12, 2019, 22 pages.
Geers, et al., "Dried Blood Spot Analysis for Therapeutic Drug Monitoring of Clozapine," Journal of Clinical Psychiatry, vol. 78, No. 9, 2017, pp. 1211-1218.

Haack, et al., "homeRNA: A self-sampling kit for the collection of peripheral blood and stabilization of RNA," bioRxiv, 2021, 11 pages.
Harris, et al., "Research electronic data capture (REDCap)—A metadata-driven methodology and workflow process for providing translational research informatics support," Journal of Biomedical Informatics, vol. 42, No. 2, 2009, pp. 377-381.
James, et al., "Will patient-centric sampling become the norm for clinical trials after COVID-19," Nature Medicine, vol. 26, 2020, 1 page.
Klumpp-Thomas, et al., "Standardization of ELISA protocols for serosurveys of the SARS-CoV-2 pandemic using clinical and at-home blood sampling," Nature Communications, vol. 12, No. 113, 2021, 13 pages.
Koulman, et al., "The development and validation of a fast and robust dried blood spot based lipid profiling method to study infant metabolism," Metabolomics, vol. 10, 2014, pp. 1018-1025.
Leuthold, et al., "New Microfluidic-Based Sampling Procedure for Overcoming the Hematocrit Problem Associated with Dried Blood Spot Analysis," Analytical Chemistry, vol. 87, No. 4, 2015, pp. 2068-2071.
Li, et al., "Improved Dried Blood Spot-Based Metabolomics: A Targeted, Broad-Spectrum, Single-Injection Method," Metabolites, vol. 10, No. 3, 2020, 15 pages.
Lim, Mark D., "Dried Blood Spots for Global Health Diagnostics and Surveillance: Opportunities and Challenges," American Society of Tropical Medicine and Hygiene, vol. 99, No. 2, 2018, pp. 256-265.
Lofgren, et al., "Evaluation of a dried blood spot HIV-1 RNA program for early infant diagnosis and viral load monitoring at rural and remote health care facilities," AIDS, vol. 23, No. 18, 2009, pp. 2459-2466.
Malsagova, et al., "Dried Blood Spot in Laboratory: Directions and Prospects," Diagnostics, vol. 10, 2020, 16 pages.
Martial, et al., "Cost Evaluation of Dried Blood Spot Home Sampling as Compared to Conventional Sampling for Therapeutic Drug Monitoring in Children," PLOS ONE, vol. 11, No. 12, 2016, 17 pages.
Martinez and Zemore, "Feasibility of a mail-in, self-administered dried blood spot collection method in national, population-based alcohol surveys in the United States," Addiction, vol. 114, No. 7, 2019, pp. 1303-1308.
Matheson, et al., "Assessment of sample collection and storage methods for multicenter immunologic research in children," Journal of Immunological Methods vol. 339, No. 1, 2008, pp. 82-89.
McDade, et al., "Genome-Wide Profiling of RNA from Dried Blood Spots: Convergence with Bioinformatic Results Derived from Whole Venous Blood and Peripheral Blood Mononuclear Cells," Biodemography and Social Biology, vol. 62, No. 2, 2016, pp. 182-197.
Opitz, et al., "Impact of RNA degradation on gene expression profiling," BMC Medical Genomics, vol. 3, No. 36, 2010, 14 pages.
Prinsenberg, et al., "Dried blood spot self-sampling at home is a feasible technique for hepatitis C RNA detection," PLOS ONE, vol. 15, No. 4, 2020, 13 pages.
Reust, et al., "Dried Blood Spot RNA Transcriptomes Correlate with Transcriptomes Derived from Whole Blood RNA," Am. J. Trap. Med. Hyg., vol. 98, No. 5, 2018, pp. 1541-1546.
Roadcap, et al., "Clinical application of volumetric absorptive microsampling to the gefapixant development program," Bioanalysis, vol. 12, No. 13, 2020, pp. 893-904.
Schroeder, et al., "The RIN: an RNA integrity number for assigning integrity values to RNA measurements," BMC Molecular Biology, vol. 7, No. 3, 2006, 14 pages.
Schuierer, et al., "A comprehensive assessment of RNA-seq protocols for degraded and low-quantity samples," BMC Genomics, vol. 18, No. 442, 2017, 13 pages.
Trifonova, et al., "Evaluation of Dried Blood Spot Sampling for Clinical Metabolomics: Effects of Different Papers and Sample Storage Stability," Metabolites, vol. 9, No. 11, 2019, 13 pages.
Vazquez-Moron, et al., "Evaluation of the diagnostic accuracy of laboratory-based screening for hepatitis C in dried blood spot

(56) References Cited

OTHER PUBLICATIONS samples: A systematic review and meta-analysis," Scientific Reports, vol. 9, No. 7316, 2019, 12 pages.

Xiong, et al., "DegNorm: normalization of generalized transcript degradation improves accuracy in RNA-seq analysis," Genome Biology, vol. 20, No. 75, 2019, 18 pages.

* cited by examiner

FLUID TRANSFER SYSTEM FOR APPLICATIONS INCLUDING STABILIZING BIOLOGICAL FLUIDS

CROSS-REFERENCE TO RELATED APPLICATION

This application claims the benefit of U.S. Provisional Application No. 63/046,561, filed on Jun. 30, 2020, which is incorporated by reference herein in its entirety.

STATEMENT OF FEDERALLY SPONSORED RESEARCH AND DEVELOPMENT

This invention was made with government support under Grant No. R35 GM128648, awarded by the National Institutes of Health. The government has certain rights in the invention.

BACKGROUND

Remote and contact-free laboratory testing is rapidly emerging as a preference method of sample collection for patient care and clinical research. However, blood sample collection and collection of other biological samples remains a challenging procedure to perform remotely as collection methods can be resource-intensive, physically uncomfortable, and inflexible in regard to collection time and location. Remote self-administered collection procedures offer many practical advantages, including expanded lab testing for rural and remote medicine applications, convenience for clinical research studies as well as the ability to recruit participants that are not able to come to the clinic (due to work schedules, caregiver responsibilities, mobility challenges, etc.), the ability to capture acute and transient biomarker fluxes (e.g., immediately following an acute exposure, an asthma attack, or a flare in an autoimmune disease), and opportunities to conduct longitudinal research studies that require frequent sample collections from the same individual over a short time course (e.g., daily blood collections). To-date these applications have been limited due to the logistical challenges associated with in-person sample collection from patients.

An example of an existing technology aimed at remote blood sampling is the use of dried blood spot (DBS) sampling. In DBS sampling, a lancet-based finger prick is used to draw blood, which is applied to a sampling paper and left to dry. The sampling paper containing the DBS is then mailed back to the lab for analysis. This technology has been applied to a variety of applications, including diagnostics and screening, therapeutic drug monitoring, and other mechanistic biomolecule analysis. Due to the increased use of DBS and convenience for remote sampling, tremendous research and development have been undertaken to improve the consistency and analysis of DBS samples. However, DBS samples tend to be associated with limited testing volumes and decreased sample viability as the latency between sample collection and analysis increases. In some implementations, a substantial sample volume of liquid blood and/or other biological sample may be desirable for applications such as genomics, transcriptomics, or the detection of rare analytes. Further, if adequately stabilized, liquid samples may provide a greater quantity and better quality of the desired analyte than DBS samples, such as a higher yield of minimally degraded total whole blood ribonucleic acid (RNA). Accordingly, a system and/or device that is configured to contain a biological sample and/or a stabilized biological sample can enable remote collection of the biological sample by the patient while obtaining a larger quantity and/or a better quality of the desired analyte for testing.

Additionally, in traditional outpatient venipuncture settings, stabilization of whole blood RNA is accomplished by collecting venous blood directly into vacutainers containing RNA stabilizers (e.g., Tempus™ by Thermo Fisher Scientific Inc. of Waltham, Mass. or Paxgene™ by BD Biosciences of Franklin Lakes, N.J.) or immediately pipetting anti-coagulated blood into RNAlater™ containing vials. However, this procedure and other similar procedures are incompatible with a self-sampling regime, as patients cannot be expected to pipette their own blood or do venipuncture into a vacutainer tube on themselves. To fully enable remote sampling and profiling of liquid blood samples, one must eliminate the need for a phlebotomist-assisted blood draw and enable the patient or research participants to act as their own laboratory technician, allowing them to perform necessary steps to stabilize their blood sample without the use of pipettes, gloves, or syringes.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
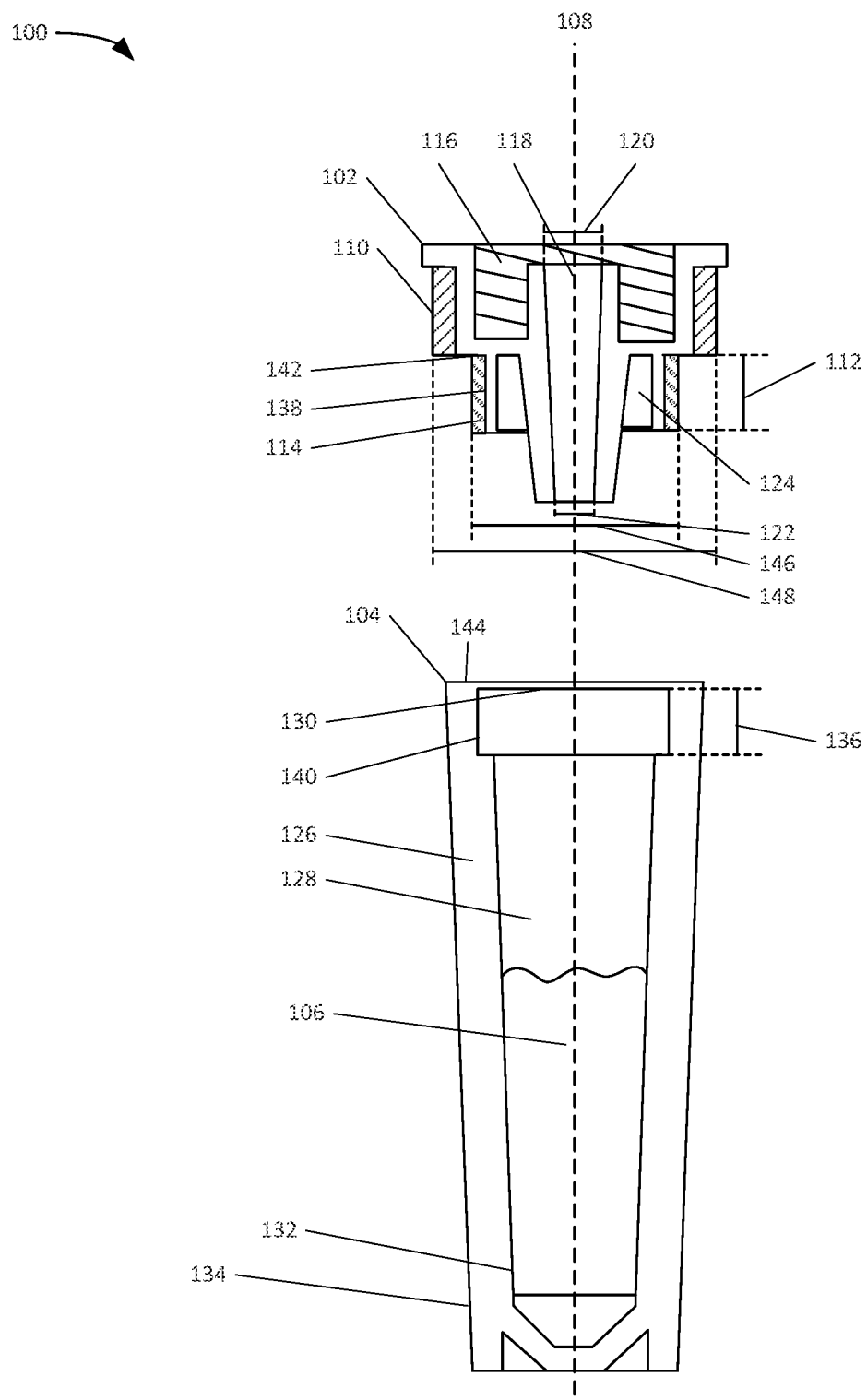
FIG. 1 illustrates an example stabilizer tube that is configured to connect with a sample tube to contain a biological sample during mixing of the biological sample with a sample stabilizer and transfer to a facility associated with processing biological samples.

Described herein are devices and/or a systems for joining two fluid-filled tubes. Various devices and/or systems described herein allow for the mixing of fluids between the tubes without the use of any transfer tools (e.g., pipettes). An example device and/or system can contain a cone-shaped feature which creates a microfluidic channel that directs fluid in one direction (into the tube) based on surface tension forces, therefore preventing the outward flow of the liquid (spilling). In some implementations, the example device and/or system is used to mix a whole blood sample and a liquid RNA stabilizer. More generally, the example device and/or the system is used to mix a biological sample with a stabilizing agent such that a remotely collected sample can be sent to a medical facility and/or other laboratory. Various devices and/or systems described herein may be used in a home sampling kit and/or a remote blood sampling kit that enables stabilization of the biological sample within a no-spill tube that contains a stabilizer. When the kit is coupled to a blood collection device, the kit allows for the self-collection of peripheral blood (e.g., approximately 0.5 mL) and stabilization of whole blood RNA and proteins from the self-collection. The no-spill tube can be configured to include any stabilizer to allow for preservation of various blood components (e.g., cytokines, small molecules), or potentially other samples (e.g., saliva, urine) or more generally, two liquids requiring mixing without a transfer mechanism. This system can be used for preservation of blood RNA (e.g., using RNAlater™, by Thermo Fisher Scientific Inc. of Waltham, Mass., as the stabilizer) and other blood components pertinent to human health and various diseases (infectious and non-infectious).

For example, remote collection and stabilization of a biological sample can be provided such that a patient can collect a blood sample, stabilize the blood sample, and send the blood sample to a collection facility. In particular, a commercially available lancet-based blood sampling device (e.g., Tasso-SST™ by Tasso Inc. of Seattle, Wash.) can be utilized to enable the patient collecting the blood sample, a liquid RNA stabilizer (e.g., RNAlater™) can be utilized to stabilize the blood sample, and a custom-engineered fluid transfer and stabilizer tube can be created and sent (e.g., mailed) patients (or research participants). Additionally, the patient can collect a liquid sample (e.g., 0.1-0.5 mL) of whole blood, stabilize it, and ship it back to the laboratory for analysis. It should be noted that while the discussion above and below commonly references the collection and stabilization of blood samples, the systems, devices, and techniques are broadly applicable such that a variety of samples can be collected by patients, stabilized via different stabilizers, and sent for analysis that targets various classes of biomarkers or other indicators of interest.

The description of implementations of the disclosure is not intended to be exhaustive or to limit the disclosure to the precise form disclosed. While the specific implementations of, and examples for, the disclosure are described herein for illustrative purposes, various equivalent modifications are possible within the scope of the disclosure.

Specific elements of any foregoing implementations can be combined or substituted for elements in other implementations. Moreover, the inclusion of specific elements in at least some of these implementations may be optional, wherein further implementations may include one or more implementations that specifically exclude one or more of these specific elements. Furthermore, while advantages associated with certain implementations of the disclosure have been described in the context of these implementations, other implementations may also exhibit such advantages, and not all implementations need necessarily exhibit such advantages to fall within the scope of the disclosure.

In some particular implementations, a biological sample stabilizer (also referred to as a "stabilizer") may be in liquid, gel, semi-solid, and solid form, and may include organic and/or inorganic compounds. In particular, the biological sample stabilizer may include one or more anticoagulants, buffering agents, chaotropic salts, cationic detergents, chelating agents, drying agents, fixative reagents, lysing agents, preservation reagents, ribonuclease inhibitors, stabilizing agents, surfactants, other substances intended to preserve a specific element within the biological sample, or any combinations thereof. These materials may include acetic acid, acetone, EDTA, ethanol, formaline, methanol, polyethylene glycol, propanol, quanidium, sodium acetate, trichloracetic acid, or any combination thereof. In particular implementations, the biological sample stabilizer may be an aqueous form and may contain one or more salts configured to precipitate nucleic acid and cellular proteins. For instance, the biological sample stabilizer may include a sulfate, such as ammonium bisulfate, ammonium sulfate, cadmium sulfate, cesium iron (II) sulfate, cesium sulfate, chromium (III) sulfate, cobalt (II) sulfate, copper (II) sulfate, lithium sulfate, magnesium sulfate, manganese sulfate, potassium sulfate, sodium sulfate, zinc sulfate, or any combination thereof. In particular implementations, the biological sample stabilizer may include a commercially available stabilizer, such as at least one of LeukoLOCK™ by Thermo Fisher Scientific Inc. of Waltham, Mass., PAXgene® by Qiagen, LLC of Germantown, Md., RNAgard® by Biomatrica of San Diego, Calif., RNAlater®, RNAprotect® by Qiagen, LLC of Germantown, Md., or Tempus™.

In some particular implementations, the stabilizer, a biological sample, and/or other fluids, referred to in various implementations, can be specific implementations of a reagent, wherein the term reagent, as used herein, may refer to a compound and/or a solution that is utilized to mix with, react with, and/or otherwise interact with another compound (e.g., another reagent). Additionally, while specific implementations may recite that the stabilizer and/or the biological sample are stored within containers, sample stabilizer tubes, and sample tubes, other reagents can be utilized in a similar manner such that a first reagent is stored within a first container and a second reagent is stored within a second container. Further, the term reagent may refer to a compound and/or a solution that includes an organic compound, an inorganic compound, a toxic compound, a biological sample, and/or other compound that is to be stored within the containers. The solution can be an aqueous solution, a non-aqueous solution, an ionic-solution, and/or other solution that includes at least one solute and at least one solvent.

In some particular implementations, as used herein the terms sample stabilizer tube and sample tube, and their equivalents, may refer to a three-dimensional object that includes one or more walls that at least partially enclose an internal volume and formed, via an injection molding process, to contain an amount of a fluid for storage. Alternatively, the sample stabilizer tube and the sample tube can be fabricated by a casting process, a sintering process, a three-dimensional printing process, and/or other manufacturing process. Additionally, the terms sample stabilizer tube and sample tube can be specific implementations of a container, wherein the term container, as used herein, may refer to a three-dimensional structure that includes one or more walls that at least partially enclose and internal volume. It should be noted that the term container can include vials (e.g., three-dimensional containers that contain a fluid, such as a liquid stabilizer, and that are a sub-component utilized to assemble another component), vessels (e.g., three-dimensional containers that are substantially fluidly sealed and formed from temporary coupling of two or more components), and tubes (e.g., three-dimensional containers that are components that are utilized individually and in combination to store one or more fluids). In particular, containers may be fabricated from glass, nylon, plastic, polyethylene naphthalate polyvinyl chloride, polyethylene terephthalate, polyolefin, polypropylene, quartz, one or more copolymers, another material that is relatively non-reactive with collected biological samples, or any combination thereof. In particular implementations, the container may include a coating that includes a material such as EDTA, heparin, sodium citrate, a surfactant, or any combination thereof. In some cases, the coating includes an anticoagulant coating. According to some implementations, the coating is configured to dissolve one or more components of the biological sample.

FIG. 1 illustrates an example sample stabilizer tube 100 that is configured to connect with a sample tube and contain a biological sample that may mix with a sample stabilizer and be transferred to a facility associated with processing biological samples. In particular, the sample stabilizer tube 100 can be comprised of an adaptor 102 that is configured to connect with the sample tube and a reagent vial 104 that is configured to house a stabilizer 106. Additionally, the adaptor 102 and the reagent vial 104 can be configured such that a longitudinal axis 108 extends substantially centrally through the adaptor 102 and the reagent vial 104 when the sample stabilizer tube 100 is assembled. The adaptor 102 can include a grasping surface 110, an insert 112, a sealing surface 114, a sample tube interface 116, and a fluid channel 118. It should be noted that the fluid channel 118 extends from a first opening 120 to a second opening 122 and through a lower surface 124 of the adaptor 102 that extends from the sealing surface 114 to the second opening 122. The reagent vial can include an exterior wall 126, an internal volume 128, and a third opening 130. Further, the exterior wall can include an internal surface 132 and an external surface 134.

In some particular implementations, the adaptor 102 can be configured to connect with a sample tube that contains a biological sample. The biological sample can be collected by the patient via a remote device that deposits the biological sample within the sample tube, manual provisioning of the biological sample, a third party extracting the biological sample, and/or other collection method. Additionally, the sample tube can include a sample tube opening that is received by the adaptor 102 and substantially sealed to the adaptor 102 such that the biological sample can be sealed via the adaptor 102 and the reagent vial 104, wherein the biological sample is substantially prevented from leaking and/or spilling due to a physical coupling (e.g., a seal) between the sample stabilizer tube 100 and the sample tube. Further, the adaptor 102 can be configured to enable the biological sample within the sample tube and the stabilizer 106 to mix via the fluid channel 118. It should be noted that the stabilizer 106 can be a liquid stabilizer 106 that is stored within the reagent vial 104. Alternatively, the stabilizer 106 can be a solid, a powder, an emulsion, a solution, a mixture, a suspension, and/or other type of stabilizer associated with the biological sample. Accordingly, the adaptor 102 can be configured and/or designed based at least on the sample via that the adaptor 102 is intended to combine with such that the sample tube may be combined with the reagent vial 104, via the adaptor 102, and the stabilizer 106 mixed with the biological sample.

In some particular implementations, the adaptor 102 can include the grasping surface 110 that is utilized to secure the adaptor while connecting the sample tube with the adaptor 102 via the sample tube interface 116. For example, the grasping surface 110 can be an abrasive surface, a set of raised ridges, and/or other surface that the patient can grasp to combine the sample tube with the adaptor 102 and/or the reagent vial 104. Additionally, the patient can combine the sample tube with the adaptor 102 via the sample tube interface 116. In particular, the sample tube interface 116 can receive the opening of the sample tube such that the biological sample can exit the sample tube via the fluid channel 118. The sample tube interface 116 can be a threaded opening that the sample tube screws into, a clamp that is configured to secure the sample tube via a protrusion that extends radially outward from the opening of the sample tube (e.g., at least one a lip, a ridge, etc.), and/or via another fastening mechanism that can secure the sample tube with the adaptor 102 and can substantially prevent leaks and/or spills of the biological sample. Further, the sample tube interface 116 can be designed to fit and couple to the sample tube such that the sample tube interface 116 is a negative of the sample tube opening and/or is designed based at least on the negative of the sample tube opening. It should be noted that the negative can be a cast, an imprint, or other representation of the sample tube opening that can be utilized to generate at least a portion of the sample tube interface 116. Similarly, the term structural negative, and its equivalents, may refer to a physical structure that is generated from an existing object that is configured to couple to the existing object and/or one or more additional objects that are substantially similar to the existing object. Accordingly, the sample tube can be received by the adaptor 102 and secured via the sample tube interface 116.

In some particular implementations, the adaptor 102 can be configured to form the sample stabilizer tube 100 with the reagent vial 104. As will be discussed in greater detail below, the reagent vial 104 can include the third opening 130 that is configured to receive the insert 112 of the adaptor 102, the third opening 130 being associated with a receiving portion 136 of the internal volume 128. Additionally, the third opening 130 can enable the adaptor 102 to be adhered to and/or otherwise connected with the reagent vial 104 via the receiving portion 136. When the adaptor 102 is combined with the reagent vial 104, the insert 112 can extend through the third opening 130 such that the sealing surface is disposed radially within the receiving portion 136 of the internal volume. Accordingly, the insert 112 can be disposed radially outward from the fluid channel 118 and configured to extend through the third opening 130 and into the receiving portion 136. While the insert 112 is in proximity to the receiving portion 136, a substantially fluid-tight seal can be formed between the sealing surface 114 and the exterior wall 126 of the reagent vial 104.

In some implementations, the insert 112 can be a cylindrical structure that extends longitudinally from the adaptor 102. Additionally, the insert 112 can extend circumferentially around the fluid channel 118 such that the fluid channel 118 is at least partially surrounded by the insert 112. In particular, the insert 112 and the fluid channel 118 can be configured such that, for a radial plane, the insert 112 is disposed radially outward from the fluid channel 118 (e.g., the insert 112 and the fluid channel 118 are at least partially concentric). Alternatively, or in addition, the insert 112 and the fluid channel 118 can be configured such that the insert 112 and the fluid channel 118 do not share an additional radial plane (e.g., the fluid channel 118 extends a first distance from the adaptor 102 and the insert 112 extends a second distance from the adaptor 102 such that the first distance is greater than/less than the second distance).

In some implementations, the sealing surface 114 of the adaptor 102 can be configured to be adhered to the receiving portion 136 of the reagent vial 104. In particular, the insert 112 can extend through the third opening 130 such that the insert 112 is in physical proximity and/or physical contact with the receiving portion 136 enables a substantially fluid tight seal to be formed between the insert 112 and the exterior wall 126 that defines the receiving portion 136. More specifically, a first surface 138 of the sealing surface 114 can be in physical proximity and/or physical contact with an inner surface 140 of the receiving portion 136. Alternatively, or in addition, a second surface 142 of the sealing surface 114 can be in physical proximity and/or physical contact with the top surface 144 of the receiving portion 136. Additionally, the insert 112 can be substantially adhered to the receiving portion 136 via an adhesive, an epoxy, a glue, and/or other adhering agent that is applied to at least one of the first surface 138, the inner surface 140, the second surface 142, and/or the top surface 144. Accordingly, the sealing surface 114 and the receiving portion 136 can be configured such that combining the adaptor 102 with the reagent vial 104 forms a substantially fluid tight seal that prevents fluids from leaking and/or spilling out of the sample stabilizer tube 100.

In some implementations, the adaptor 102 can include the fluid channel 118 such that one or more fluids can enter the internal volume 128 of the reagent vial 104 via the fluid channel 118. Additionally, the fluid channel 118 can be configured such that the stabilizer 106 is substantially prevented from exiting the internal volume 128 via the fluid channel 118. In particular, the fluid channel 118 can be configured to extend from the first opening 120 to the second opening 122, wherein the first opening 120 has a first diameter that is greater than a second diameter of the second opening 122. Further, a fluid channel diameter of the fluid channel 118 can be equal to the first diameter at the first opening 120 and equal to the second diameter at the second opening 122, wherein the fluid channel diameter contracts as the fluid channel 118 is longitudinally traversed from the first opening 120 to the second opening 122. Accordingly, the fluid channel 118 can be configured to cause fluid that enters the fluid channel 118 from the first opening 120 and the second opening 122 to move toward the internal volume 128. More specifically, the fluid channel 118 is configured such that the contact angle (e.g., the angle of incidence between a fluid and a surface) causes the surface tension of the fluid to direct the fluid into the internal volume 128 of the reagent vial 104.

In some additional implementations, the fluid channel 118 can be formed from a material that modifies the contact angle of the fluid such that the surface tension directs the fluid within the fluid channel 118 into the internal volume of the reagent vial 104. It should be noted that the contact angle of a fluid refers to an angle of incidence that is formed between the fluid and a surface that the fluid is in contact with, wherein the contact angle is common a static value for a combination of fluid and material. In particular implementations, the biological sample is a bodily fluid such as blood, urine, saliva, and/or other fluids produced by a human body. Additionally, the biological sample often has a known contact angle and/or a known range of contact angles that may be modified by solutes, suspended particles, emulsified fluids, the mixture of one or more fluids (e.g., the biological sample and the stabilizer 106), and/or other characteristics of the fluid. Further, the contact angle of the biological sample can be modified by a material of the fluid channel 118, a coating that is applied to the fluid channel 118, and/or other treatment of the fluid channel 118. Accordingly, the fluid channel 118 can be configured such that the contact angle between the fluid and the fluid channel 118 enables the fluid channel 118 to substantially prevent the biological sample and/or the mixture of the biological sample with the stabilizer 106 from leaking or spilling, via the first opening 120 and/or the second opening 122, into the surrounding environment. It should be noted that the fluid channel 118 can be configured to prevent leaking and/or spilling when the sample stabilizer tube 100 is upright (e.g., the longitudinal axis is parallel to the direction of gravity and the first opening 120 is above the second opening 122), on its side (e.g., the longitudinal axis is substantially perpendicular to the direction of gravity), inverted upright (e.g., the longitudinal axis is parallel to the direction of gravity and the first opening 120 is below the second opening 122), and/or is in any other orientation.

In some further implementations, the fluid channel 118 longitudinally extends from the adaptor 102 into at least one of the reagent vial 104 and/or the sample tube when the reagent vial 104 and the sample tube are coupled to form a sample vessel. In particular, the fluid channel 118 can extend from the adaptor 102 into the internal volume 128 of the reagent vial 104. Alternatively, or in addition, the fluid channel 118 can extend from the adaptor 102 into the sample vial. Additionally, the fluid channel 118 can be configured to minimize the stabilizer 106 and/or mixtures of the stabilizer 106 and the biological sample that enter the fluid channel 118 when the sample stabilizer tube 100 is knocked over. For some implementations, the second opening 122 can be disposed within the internal volume 128 due to the fluid channel 118 extending from the adaptor 102 into the reagent vial 104 (as illustrated). For some additional implementations, the second opening 122 can be disposed on a lower surface of the adaptor 102. Similarly, the first opening 120 can be disposed on an upper surface of the adaptor 102 or within the sample tube (when the sample tube is combined with the adaptor 102) due to the fluid channel 118 extending from the adaptor 102 into the sample tube (as illustrated). Accordingly, the fluid channel 118 is configured to substantially prevent and/or minimize the amount of fluid that is leaked and/or spilled in a scenario where the sample stabilizer tube 100 is knocked over, dropped, struck, or otherwise rotated.

In some implementations, the fluid channel 118 can be configured such that the stabilizer 106 is substantially contained within the internal volume 128 of the reagent vial 104. In particular, the fluid channel 118 can be configured to substantially pin the stabilizer 106 and/or other fluids within the internal volume 128 and the fluid channel 118. Additionally, the fluid channel 118 can be configured such that a diameter of the fluid channel 118 enables capillary action to cause the stabilizer 106 and/or other fluids within the fluid channel 118 to flow and/or move towards the second opening 122. For instance, the diameter of the fluid channel 118 may be configured to be a single diameter and/or a range of diameters between 0.5 millimeters and 5 millimeters for a material of the fluid channel 118. Further, the diameter of the fluid channel 118 can be configured to gradually change from the first diameter of the first opening 120 to the second diameter of the second opening 122. For instance, the diameter of the fluid channel 118 may vary from 3.33 millimeters (e.g., the first diameter) at the first opening 120 to 2.5 millimeters (e.g., the second diameter) at the second opening 122. Alternatively, the diameter of the fluid channel 118 may vary from 4 millimeters (e.g., the first diameter) at the first opening 120 to 3 millimeters (e.g., the second diameter) at the second opening 122. It should be noted that while the above ranges and implementations may be utilized in the described systems and methods, the configuration of the fluid channel is not limited to the above values. In general, the fluid channel 118, the first opening 120, and the second opening can be configured such that fluid within the fluid channel 118. can moved towards the second opening 122 (or the smaller opening of the first opening 120 and the second opening 122).

In some implementations, the adaptor 102 and the reagent vial 104 can be combined to form the sample stabilizer tube 100. In particular, the adaptor 102 can be configured to be combined with the reagent vial 104 such that the internal volume 128 is contains the stabilizer 106, wherein the exterior wall 126, the adaptor 102, the insert 112, the sealing surface 114, and the fluid channel 118 define the internal volume 128 that the stabilizer resides within. Additionally, the adaptor 102 and the reagent vial 104 can be combined by inserting the insert 112 through the third opening 130 and securing the insert 112 within the receiving portion 136. For example, an amount of a ultraviolet (UV) curing epoxy can be deposited on the sealing surface 114 (e.g., on the first surface 138 and/or the second surface 142) such that when the adaptor 102 is combined with the reagent vial 104 and exposed to UV radiation, the epoxy binds the insert 112 to the reagent vial 104 such that the adaptor 102 and the reagent vial 104 are permanently combined. It should be noted that while the UV curing epoxy is referenced as an example, any adhesive, epoxy, polymeric glue, and/or other adhering agent can be utilized. Similarly, heat sealing and chemical sealing techniques may be utilized to connect the sealing surface 114 to the reagent vial 104. Further, the insert 112 can be configured such that an insert diameter 146 is less than or equal to a diameter of the third opening 130. Similarly, an adaptor diameter 148 can be configured to be greater than or equal to a reagent vial diameter such that the second surface 142 is in contact with the top surface 144 of the reagent vial 104. Accordingly, the adaptor 102 and the reagent vial 104 can be combined at one or more points of contact between the insert 112 (or the sealing surface 114) and the receiving portion 136 (or the top surface 144) of the reagent vial 104.

In some implementations, the reagent vial 104 can include the exterior wall 126 that substantially defines the internal volume 128 such that an amount of the stabilizer 106 can be stored within the reagent vial 104. The internal volume 128 can be determined such that the reagent vial 104, and by extension the sample stabilizer tube 100 formed from the reagent vial 104 and the adaptor 102, is configured to contain the amount of the stabilizer 106 and/or an additional amount of the biological sample. The reagent vial can be formed via an injection molding process, a casting process, a sintering process, and/or other manufacturing process configured to produce the reagent vial 104. Similarly, the adaptor 102 can be formed via similar manufacturing processes as the reagent vial 104, wherein the reagent vial 104 and the adaptor 102 may be formed by a single manufacturing process or different manufacturing processes. Additionally, the adaptor 102 and the reagent vial 104 can be manufactured as a first component and a second component of the sample stabilizer tube 100 such that the internal volume 128, when the sample stabilizer tube 100 is formed, is defined by the internal surface 132 of the exterior wall 126, the lower surface 124 of the adaptor 102, and the second opening 122.

In some particular implementations, the internal surface 132 of the exterior wall 126 can be configured to define the internal volume 128 and contain the stabilizer 106. More specifically, the internal surface 132 can be formed from the material of the exterior wall 126 or an additional material different from the material of the exterior wall 126. Additionally, the internal surface 132 can include a coating that is applied to the exterior wall 126, a deposited material that is applied to the internal surface 132, and/or other treatment of the internal surface 132. It should be noted that the material of the internal surface 132 can be selected based at least on the contact angle of the stabilizer 106 and/or the biological sample (e.g., aqueous solutions may utilize a hydrophobic or hydrophilic material), a corrosive property of the stabilizer 106 and/or the biological sample (e.g., a nonreactive material may be selected to prevent degradation of the exterior wall 126), an infectiousness rating of the biological sample (e.g., a durable material may be selected to prevent damage to the sample stabilizer tube 100), and/or other property of the stabilizer 106 and/or the biological sample. Further, the lower surface 124 of the adaptor 102 and the fluid channel may be formed and treated similar to the internal surface 132 such that the internal volume 128 (and by extension the stabilizer 106/biological sample) is contained by one or more surfaces that are comprised of similar materials having similar properties.

Accordingly, the two primary design considerations of the sample stabilizer tube 100 can be preventing exposure to the stabilizer 106 and preventing leaking or splashing when the biological sample and the stabilizer 106 are mixed. Designing the sample stabilizer tube in view of the above factors can enable in home and remote collection of the biological sample, particularly for collecting bodily fluids to ensure that both the biological sample and the stabilizer 106 solution remains contained within the sample stabilizer tube 100 throughout the stabilization process and during transmit to the collection facility. Additionally, surface tension can be utilized in addition to the design of the sample stabilizer tube 100 to achieve the objective of preventing exposure to the stabilizer. In particular, the sample stabilizer tube 100 can be configured to include a cone-shaped fluid channel (e.g., the fluid channel 118) at the connection point between the sample stabilizer tube 100 and the sample tube. The cone-shaped fluid channel can utilize the surface tension to create a valve such that the stabilizer 106 (or solutions of the biological sample and the stabilizer 106) remains in the sample stabilizer tube 100 when the sample stabilizer tube 100 is inverted.

In at least one implementation, the components that are included in the sample stabilizer tube 100 (e.g., the reagent vial 104 and the adaptor 102) are injection molded out of a polycarbonate material to account for consistent material shrinkage during the injection molding process. Polycarbonate materials, for example, are nonreactive and/or inert to most biological samples and reagents (e.g., the biological sample and the stabilizer 106).

Figure 2:
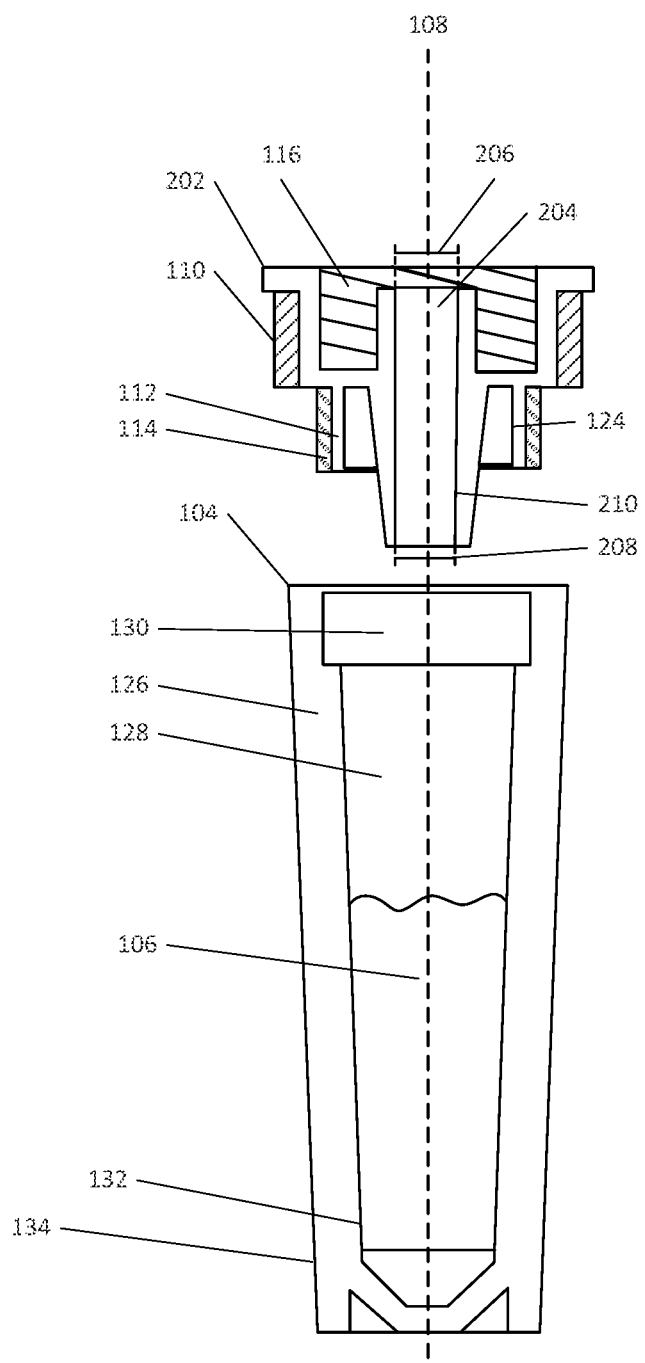
FIG. 2 illustrates an example stabilizer tube that is configured to connect with a sample tube and enable a biological sample and stabilizer solution to be extracted from the sample stabilizer tube.

FIG. 2 illustrates an example sample stabilizer tube 200 that is configured to connect with a sample tube and enable a biological sample and liquid stabilizer solution to be extracted from the sample stabilizer tube 200. In particular, the sample stabilizer tube 200 can be comprised of an adaptor 202 that is configured to connect with the sample tube and the reagent vial 104. It should be noted that the sample stabilizer tube can include many of the features discussed above by FIG. 1, including the reagent vial 104, the grasping surface 110, the insert 112, the sealing surface 114, the lower surface 124, the exterior wall 126, the internal volume 128, the receiving portion 136, the internal surface 132 and the external surface 134. Additionally, the longitudinal axis 108 extends substantially centrally through the adaptor 202 and a fluid channel 204 that extends from a first opening 206 to a second opening 208.

In some particular implementations a first diameter of the first opening 206 can be substantially the same as a second diameter of the second opening 208. In particular, the fluid channel 204 can maintain a substantially constant diameter from the first opening 206 to the second opening 208. Additionally, the fluid channel 204 can be configured to substantially prevent the liquid stabilizer 106 and/or the biological sample from entering the fluid channel 204 via the second opening 208 and traversing the fluid channel 204 to the first opening 206. It should be noted that design decisions, such as the first diameter, the second diameter, and the diameter of the fluid channel 204, can impact performance (e.g., the capability of the fluid channel 204 to prevent leaks and/or spills) and incorporate trade-offs between the performance of the fluid channel 204, safety features of the fluid channel 204, and quality of life improvements of the fluid channel 204. For example, the fluid channel 118 may have improved performance in preventing leaks and/or spills in comparison to the fluid channel 204 due to the design of the fluid channel 118, but may cause a user (e.g., a lab technician) to utilize a glass, rather than a plastic, pipette to extract the biological sample and/or the liquid stabilizer 106. In contrast, the fluid channel 204 may have decreased performance in preventing leaks and/or spills in comparison to the fluid channel 118, but may enable the user to extract the biological sample and/or the liquid stabilizer 106 with a plastic pipette. In some cases, plastic pipettes are preferred because plastic pipettes are easier and safer to use than glass pipettes, because they are less likely to break and/or pierce the skin of users than glass pipettes. Accordingly, the fluid channel 204 and additional fluid channels may be designed to target a variety of performance goals based on safety considerations (e.g., a highly infectious sample may result in the design of the fluid channel 118 being utilized), ease of use considerations (e.g., fluid channel 204 may be easier for technicians to extract samples from), manufacturing considerations (e.g., it is cheaper to produce the fluid channel 204 due to the fluid channel 204 being substantially cylindrical), and other considerations.

In some particular implementations, the fluid channel 204 can include a fluid channel wall 210 that is configured to direct the biological sample from the sample tube to the reagent vial 104 and prevent the liquid stabilizer 106 and the biological sample within the reagent vial 104 from traversing the fluid channel 204. Similar to the above discussion of the internal surface 132 of the exterior wall 126, the fluid channel wall 210 can be formed from a material and/or treated to improve the spill and/or leak prevention capability of the fluid channel wall 210. In particular, the adaptor 202 can be formed, via a variety of manufacturing processes, from a first material. Additionally, the fluid channel wall 210, and by extension the fluid channel 204, may include the first material and/or a second material that provides improved contact angle and/or surface tension for fluids in contact with the fluid channel wall 210 such that the fluids are at least partially prevented from traversing the fluid channel 204 from the second opening 208 to the first opening 206. Alternatively, or in addition, the fluid channel wall 210 may be formed from the first material and have the second material deposited onto the first material via coating techniques, deposition techniques, and other treatments of the fluid channel wall 210.

In some particular implementations, the fluid channel 204 can include internal variations in the fluid channel wall 210. It should be noted that while the above discussions are directed to a cone-shaped fluid channel (e.g., the fluid channel 118) and a cylindrical fluid channel (e.g., the fluid channel 204), the fluid channel and the fluid channel wall 210 can be formed in a variety of configurations that target one or more priorities (e.g., leak prevention, spill prevention, safety, ease-of-use, shipping stability, etc.). Additionally, the one or more priorities targeted by a fluid channel configuration may result in additional diameter variations of the first opening 120 and the second opening 122, further diameter variations of the fluid channel, coatings that are applied to the fluid channel wall, materials utilized to form the fluid channel wall, and other configurable variables of the fluid channel. Further, the priorities may be modified based on infection risks from the biological sample, toxicity concerns associated with the liquid stabilizer 106, and other factors associated with individual biological sample-liquid stabilizer combinations. Accordingly, the fluid channel may utilize a variety of fluid channel wall designs (e.g., tapered from a larger first opening to a smaller second opening, tapered from a larger second opening to a smaller first opening, a constant diameter fluid channel, a fluid channel with a larger diameter than the first opening and the second opening, etc.) and a variety of fluid channel materials (e.g., materials that the fluid channel is formed from, coatings of the fluid channel, etc.) to achieve a desired performance for the biological sample and the liquid stabilizer 106.

Figure 3:
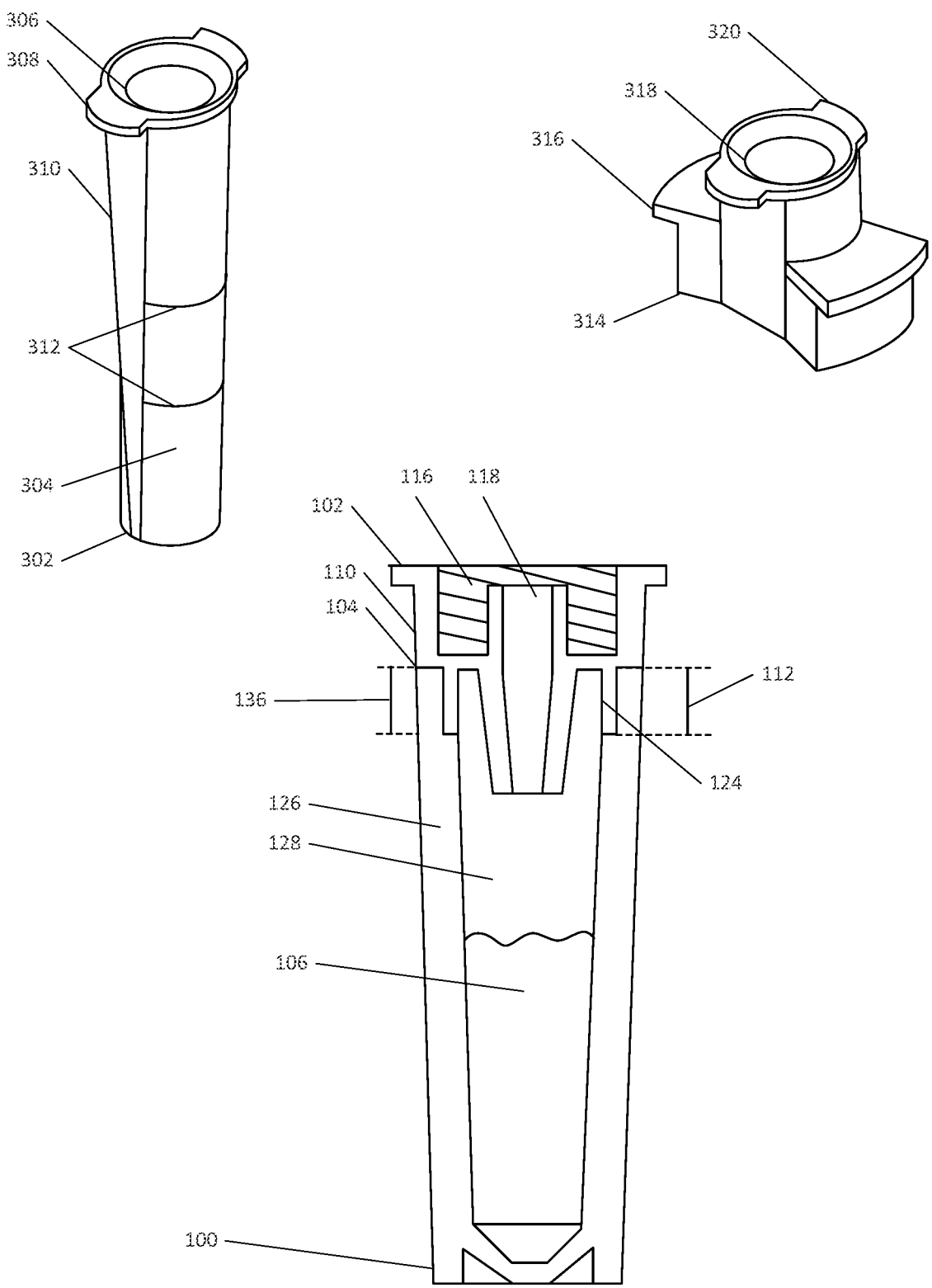
FIG. 3 illustrates an example stabilizer tube that is configured to couple to a sample tube via a sample tube interface and a protective lid via the sample tube interface.

FIG. 3 illustrates the sample stabilizer tube 100 configured to couple with a sample tube via a sample tube interface and a protective lid via the sample tube interface. In particular, the sample stabilizer tube 100 can be associated with a sample tube 302 that is utilized to determine a design of the sample tube interface 116. Additionally, the sample tube 302 can include an internal sample volume 304, a sample tube opening 306, a sample tube rim 308, a grasping surface 310, and fill indicators 312. Further, the sample stabilizer tube 100 can be associated with a protective lid 314 that includes an additional grasping surface 316, a sample stabilizer tube seal 318, and a protective lid rim 320.

In some particular implementations, the sample stabilizer tube 100 can include features discussed above with reference to FIG. 1 and FIG. 2. In particular, the sample stabilizer tube 100 can include the adaptor 102 combined with the reagent vial 104 where the exterior wall 126 of the reagent vial 104 contacts the sealing surface 114 of the adaptor 102. Additionally, the insert 112 and the receiving portion 136 are concentrically disposed and form a substantially fluid tight seal. Accordingly, the sample stabilizer tube 100 can be combined with the sample tube 302 to form a sample vessel that securely contains the stabilizer 106 and the biological sample for transport to a collection location.

In some particular implementations, the sample tube 302 can be configured to couple with a sample collection device such that a patient can collect a biological sample and send the biological sample to the collection location. It should be noted that the collection location can be a medical facility, a research facility, a medical laboratory, or other facility associated with receiving and analyzing biological samples. Additionally, the sample collection device can be activated and/or otherwise utilized by the patient to extract the biological sample (e.g., blood, urine, saliva, cell matter, etc.) and store the biological sample within the sample tube 302. Alternatively, or in addition, the sample tube 302 can be manually utilized by the patient to store the biological sample. Accordingly, the biological sample can be provided to the internal sample volume 304 of the sample tube 302. Further, the biological sample can be stored within the internal sample volume 304 until the sample tube 302 is combined with the sample stabilizing tube 100.

In some additional implementations, the sample tube 302 can be configured such that the biological sample does not leak and/or spill from the internal sample volume 304 without a force being applied to the sample tube 302 by the patient (or other individual associated with collecting the biological sample). In particular, the sample tube 302 can be configured to be sealed, via a lid or other structure associated with the sample tube 302. Alternatively, or in addition, the internal sample volume 304 can be configured such that a surface tension of the biological sample prevents the biological sample from exiting the sample tube 302 via the sample tube opening 306. Similar to the above discussion of the fluid channel 118 and the fluid channel 204, the internal sample volume 304 can be configured to maintain sufficient surface tension for the biological sample such that the biological sample does not exit the sample tube 302 independent of agitation of the sample tube 302. It should be noted that agitation of the sample tube 302 can include shaking the sample for a period of time, vibrating the sample tube, and/or otherwise applying force to the sample tube 302 that overcomes the surface tension of the biological sample, enabling the biological sample to exit the sample tube 302. Further, the agitation of the sample can initiate turbulent fluid flow within the sample tube 302, the fluid channel 118, and/or the sample stabilizer tube 100. The turbulent fluid flow can further mix the liquid stabilizer 106 and the biological sample to create the stabilized sample for submission to the lab.

In some particular implementations, the sample tube 302 can include the sample tube opening 306 that is configured to fluidly connect with the fluid channel 118 (or the fluid channel 204). In particular, the sample tube opening 306 can be such that an opening diameter of the sample tube opening 306 is greater than or equal to the first diameter of the first opening 120 such that the fluid channel 118 extends through the sample tube opening 306 while the sample tube 302 is coupled to the sample stabilizing tube 100. Alternatively, or in addition, the sample tube opening 306 can form a substantially fluid tight seal with the first opening 120 such that the biological sample may exist the sample tube 302 via the sample tube opening and enter the fluid channel 118. Accordingly, the sample tube opening 306 can be configured to enable fluid transfer of the biological sample from the sample tube 302 to the sample stabilizing tube 100.

In some particular implementations, the sample tube rim 308 can be configured to secure the sample tube 302 to the sample stabilizing tube 100. In particular, the sample tube rim 308 can be configured to connect with the sample tube interface 116 to combine with the sample stabilizing tube 100. More specifically, the sample tube interface 116 can be designed and created to specifically receive the sample tube 302 and to secure the sample tube 302 via the sample tube rim 308. For example, the sample tube rim 308 can be utilized to create one or more threads within the sample tube interface 116 such that the sample tube 302 can be screwed into the sample stabilizing tube 100. Additionally, the sample tube rim 308 can be secure when fully screwed into the sample tube interface 116 via a locking mechanism, such as a removable stopper, may prevent the sample tube 302 from being accidentally and/or unintentionally removed from the sample stabilizing tube 100. Alternatively, or in addition, the sample tube interface 116 can be configured to secure the sample tube rim 308 when the sample tube is combined with the sample stabilizing tube 100. It should be noted that the sample tube 302 can include a grasping surface 310 similar to the grasping surface 110 of the sample stabilizing tube 100 that enables the sample tube 302 to be combined with the sample stabilizing tube 100 by the patient applying rotational force to the grasping surface 310 (e.g., the patient can hand tighten the sample tube 302 to the sample stabilizing tube 100 to form the sample vessel).

In some additional implementations, the sample tube rim 308 can be configured to couple with the sample tube interface 116 to form a sample vessel from the sample tube 302 and the sample stabilizing tube 100. In particular, and independent of a specific sample tube interface design, the sample tube rim 308 (or other fastening mechanism) can be configured to fluidly connect the sample tube 302 and the sample stabilizing tube 100 via the sample tube opening 306 and the fluid channel 118. More specifically, inserting the sample tube 302 into the sample tube interface 116 and securing the sample tube 302 to the sample stabilizing tube 100 via the sample tube rim 308 can combine the internal sample volume 304 with the internal volume 128 via the fluid channel. Accordingly, the biological sample can be transferred from the internal sample volume 304 to the internal volume 128 via the fluid channel 118.

In some implementations, the protective lid 314 can be configured to couple to the sample tube interface 116 similar to the sample tube 302. In particular the protective lid 314 can be configured to protect the stabilizer 106 against contaminants and other issues prior to combination of the sample tube 302 with the sample stabilizing tube 100. For example, the protective lid 314 can be configured to prevent outgassing and/or evaporation of the stabilizer 106, prevent foreign substances from entering the reagent vial 104 (e.g., prevent water and/or condensation from entering the reagent vial 104), prevent foreign substances from reacting with the stabilizer 106 (e.g., prevent oxidation of active ingredients), and prevent the stabilizer 106 from being otherwise degraded. Accordingly, the protective lid 314 can be configured to be coupled to the sample stabilizing tube 100 and protect the stabilizer 106 prior to the patient (or an individual associated with collecting the biological sample) forming the sample vessel.

In some particular implementations, the protective lid 314 can be configured to share the fastening mechanism of the sample tube 302. More specifically, the fastening mechanism of the sample tube 302 (e.g., the sample tube rim 308 being able to screw into a threaded interface) can be utilized as a template for the sample tube interface 116 and the protective lid rim 320. Additionally, the sample tube interface 116 can be designed to receive and couple to the fastening mechanism of the sample tube 302. Similarly, the protective lid rim 320 can be a duplicate fastening mechanism that enables the protective lid 314 to couple with the sample tube interface 116. Further, as the fastening mechanism of the sample tube 302, the sample tube interface 116, and the protective lid 314 can be determined based at least on the connection interface of the sample collection device utilized by the patient to collect the biological sample. Accordingly, the fastening mechanism is identified and duplicated, either directly or as a negative, from the sample tube 302.

In some additional implementations, the protective lid 314 can be configured to share the fastening mechanism of the sample tube 302. More specifically, the fastening mechanism of the sample tube 302 (e.g., the sample tube rim 308 being able to screw into a threaded interface) can capable of coupling with the sample tube interface 116, wherein the sample tube interface 116 is configured to couple to and secure a plurality of biological sample tubes. Additionally, the sample tube interface 116 can be designed to receive and couple to the fastening mechanism of the protective lid 314. It should be noted that the sample tube interface 116 can be designed based specifically on the sample tube 302 or can be designed as a generic interface capable of coupling with a plurality of fastening mechanisms. Accordingly, the plurality of fastening mechanisms for the sample tube 302, the protective lid 314, and other sample tubes can be identified and utilized to determine a generic interface that can secure the sample tube 302, the protective lid 314, and the other sample tubes.

It should be noted that the fastening mechanism of the sample tube 302 and/or the protective lid 314 is configured to secure the sample tube 302 and/or the protective lid 314 to the sample tube interface 116. For example, the fastening mechanism can be one or more of a screw coupling, a clamp coupling, a latch coupling, a bolted coupling, and/or other coupling that secures the sample tube 302 and/or the protective lid 314 to the sample tube interface 116.

Accordingly, the protective lid 314 can be secure via the sample tube interface 116 and substantially seal the sample stabilizing tube 100. In particular, the sample stabilizer tube seal 318 can be in physical contact with the first opening 120 of the fluid channel 118 and substantially isolate the stabilizer from an ambient environment.

Figure 4:
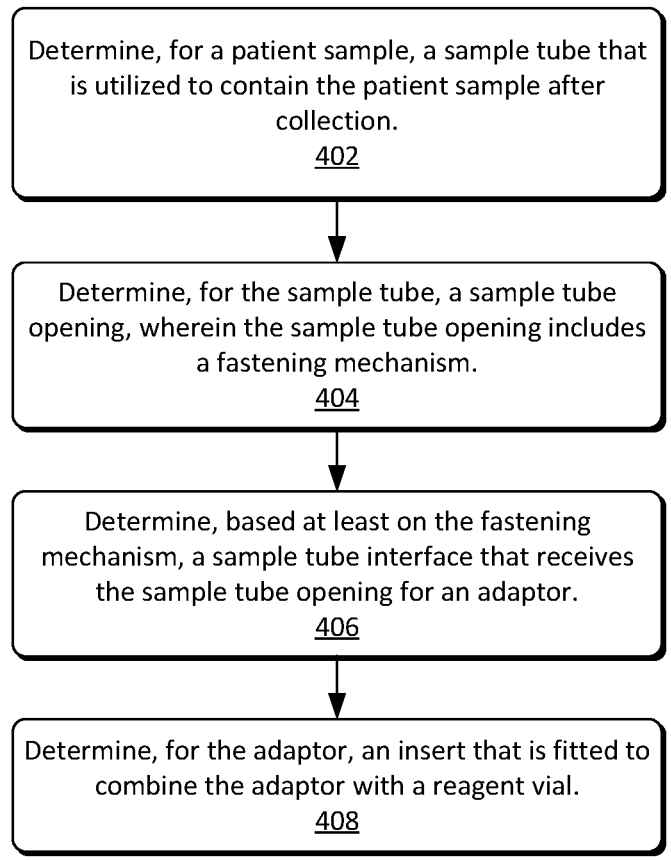
FIG. 4 illustrates a flow diagram that describes a process for generating a sample stabilizing tube for combination with a sample tube and formation of a sample vessel that stabilizes a biological sample.

FIG. 4 illustrates a flow diagram that describes a process for generating a sample stabilizing tube for combination with a sample tube and formation of a sample vessel that stabilizes a biological sample. In particular, a sample stabilizer tube can include an adaptor that is designed to receive a sample tube and form a sample vessel, the adaptor formed based at least on a rim of the sample tube, a securing point, and/or a fastening mechanism of the sample tube.

At block 402, a sample tube can be determined for use with a sample collection device that is operable by a patient. The sample tube can be determined based at least on the sample collection device that is utilized by and/or available to the patient. In particular, the patient can be instructed to collect the biological sample, store the biological sample, and send one or more biological samples to a collection facility for analysis. Additionally, the patient can own or be provided the collecting device that is utilized to extract, receive, and/or otherwise obtain the biological sample from the patient. Accordingly, the collection device can have a sample tube interface that the sample tube may be coupled to and receive the biological sample.

At block 404, a sample tube opening can be utilized to determine a fastening mechanism of the sample tube. In particular, the sample tube interface of the collection device and the sample tube can share a fastening mechanism that secures the sample tube in association with the collection device while the biological sample is being collected and/or deposited within the sample tube. Accordingly, a sample stabilizing tube can be configured to utilize the fastening mechanism to couple to the sample tube containing the biological sample and obtain the biological sample.

At block 406, the fastening mechanism can be utilized to determine a sample tube interface for integration into an adaptor. In particular, the sample stabilizing tube can be utilized to stabilize biological samples from a variety of sample tubes that are associated with a variety of sample collection devices. Accordingly, an adaptor can be attached to the sample stabilizing tube and removably couple with the sample tube. More specifically, the adaptor can be configured as the sample tube interface between the sample tube and the sample stabilizing tube. Additionally, the adaptor can be configured as a duplicate and/or a replica of the sample tube interface that couples the sample tube to the sample collection device. Further, the adaptor can be configured specifically to form a fluid tight seal that prevents contamination of the stabilizer prior to mixing with the biological sample and contamination of the stabilized sample after the stabilizer is mixed with the biological sample.

At block 408, an insert can be determined for joining the adaptor with a reagent vial. In particular, the insert can be determined to attach the adaptor to the reagent vial to form the sample stabilizing tube and enable the sample stabilizing tube to be coupled with the sample tube. Additionally, the insert and the adaptor connect to the reagent vial and the sample tube, respectively, such that a sample vessel can be formed for transport of the stabilized sample. More specifically, the sample vessel can be formed from the sample tube and the sample stabilizing tube and contain the stabilized sample during shipping, mailing, transport, and other transfers between two locations. Further, the sample vessel can be configured to contain and maintain the integrity of the stabilized sample during transport such that the stabilized sample remains untainted and viable upon arrive to the collection facility. For example, the adaptor can be configured such that the sample vessel is stable during a variety of transportation environments. In particular, the adaptor can form a substantially fluid tight seal that is stable under variable pressures, a pressure gradient (e.g., the sample vessel can be substantially sealed at atmospheric pressure, which is approximately 1 bar, and the external pressure experienced by the sample vessel can be reduced to 0.25 bar at 35000 feet while on an cargo airplane, resulting in a pressure gradient experienced by the sample vessel), elevated temperatures, lowered temperatures, and/or any combination thereof. The sample vessel can be exposed to variable pressures and pressure gradients during air transport (e.g., decreased pressure as a plane ascends and increased pressure as the plane descends), traversing mountainous terrain, and due to weather fluctuations. Similarly, the sample vessel can be exposed to elevated temperatures and lowered temperatures due to temperature fluctuations during transport. Accordingly, the adaptor can be configured to secure the biological sample and the stabilizer independent of the ambient environment surrounding the sample vessel.

In at least one implementation, the determining the insert further comprises determining a fluid channel configuration. In particular, the insert can include the fluid channel and can be configured to transfer, via the fluid channel, the biological sample from the sample tube to the reagent vial. Additionally, the fluid channel can be configured based at least on a contact angle (or a range of contact angles) associated with the biological sample and a material of the fluid channel. A first diameter of a first opening of the fluid channel and a second diameter of a second opening of the fluid channel can be configured to direct the biological sample from the sample tube to the sample stabilizing tube. For example, the first diameter can be larger than the second diameter where a force applied by surface tension determines whether the biological sample and/or the stabilizer traverses the fluid channel, substantially preventing liquids from transferring from the reagent vial to the sample tube. Alternatively, the second diameter can be larger than the first diameter where capillary force and/or hydrostatic forces determine whether the biological sample and/or the stabilizer traverses the fluid channel. Further, the fluid channel can be configured to have a variable diameter configured to prevent the biological sample and/or the stabilizer from leaking out of the reagent vial. Accordingly, a fluid channel configuration of the fluid channel may determine microfluidic interactions between the fluid channel wall and one or more fluids that enter the fluid channel.

At block 410, the sample stabilizing tube can be fabricated based at least on the fastening mechanism utilized to secure the sample tube via the sample tube opening. More specifically, the adaptor can be fabricated to include the fastening mechanism on a first surface of the adaptor and the insert on a second surface of the adaptor opposite the first surface. Additionally, the insert can be configured such that the sample stabilizing tube is fabricated by adhering the adaptor to the reagent vial via the insert. The insert and the adaptor can be provided such that the insert is within an exterior wall of the reagent vial and is adhered to the exterior wall. For example, an adhesive (e.g., a UV curing epoxy) can be applied to the insert of the adaptor. Additionally, the insert can be inserted into the internal volume of the reagent vial such that the insert and the adhesive are in physical contact with the exterior wall. Further, the reagent vial, the adaptor, and the adhesive can be allowed to set (e.g., applying UV radiation to the UV curing epoxy causes the UV curing epoxy to bind the insert to the exterior wall), attaching the adaptor to the reagent vial and forming the sample stabilizing tube.

Figure 5:
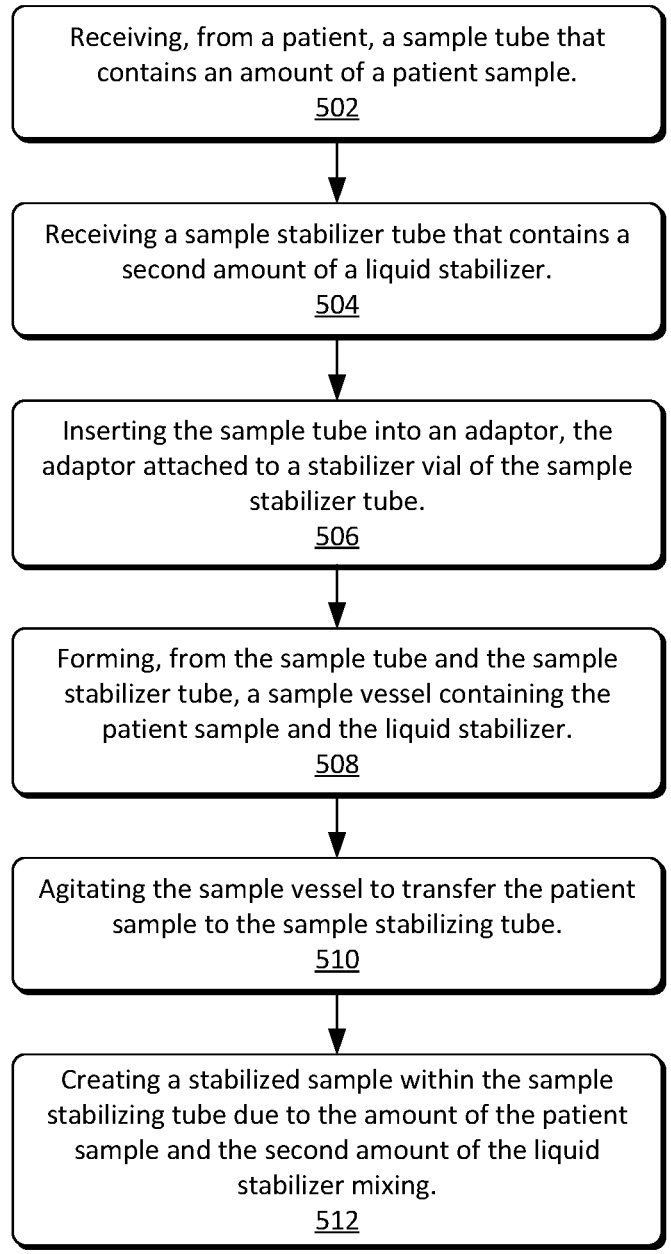
FIG. 5 illustrates a flow diagram that describes a process for collecting a biological sample and forming a sample vessel that contains a stabilized sample created by mixing the biological sample with a stabilizer.

FIG. 5 illustrates a flow diagram that describes a process for collecting a biological sample and forming a sample vessel that contains a stabilized sample created by mixing the biological sample with a stabilizer.

At block 502, a sample tube can be received from a patient that contains a first amount of a biological sample. In particular, and as discussed above, a sample collection device can be utilized to obtain the biological sample from the patient, whether by the patient themself or by an individual that assists the patient in collecting the biological sample. Additionally, the first amount of the biological sample can be indicated by the sample collection device and/or by one or more fill indicators on the sample tube (e.g., fill indicators 312). Further, the sample tube can be received from the patient or an associated source after the sample collection device deposits the biological sample within the sample tube and the sample tube is removed from the sample collection device.

At block 504, a sample stabilizer tube can be received that contains a second amount of a stabilizer. In particular, the sample stabilizer tube may be received as an individual measurement to be returned to the collection facility via mail and/or shipping. Alternatively, the sample stabilizer tube may be received as a single unit of a testing set, wherein the testing set may be returned individually or as the testing set after the sample stabilizer tubes of the testing set are fully utilized to store biological samples. Additionally, the second amount of the stabilizer can be determined based at least on the first amount of the biological sample and/or a maximum sample amount that can be provided by the sample collection device. More specifically, the second amount of the stabilizer can be configured to stabilize the first amount of the biological sample up to the maximum sample amount that can be obtained from the patient and stored within the sample tube. For example, a commercially available lancet-based blood sampling device (Tasso-SST™), can be configured to collect a liquid sample of approximately 0.1-0.5 mL of whole blood. Additionally, the sample stabilizer tube may be configured to contain the second amount of the stabilizer, wherein the second amount is sufficient to stabilize up to 0.5 mL of whole blood for transport to a laboratory for analysis.

At block 506, the sample tube can be inserted into an adaptor of the sample stabilizer tube. As noted above, the sample tube can be configured such that inverting the sample tube does not cause the biological sample to leak and/or spill from the sample tube. Alternatively, or in addition, the sample stabilizer tube can be configured such that inverting the sample stabilizer tube does not cause the stabilizer to leak and/or spill from the fluid channel of the adaptor. Accordingly, the sample tube and the sample stabilizer tube can be coupled via the adaptor without spilling the biological sample and/or the stabilizer.

Additionally, the adaptor can be a two-part adaptor that is configured to include the fluid channel that is split between the sample tube and the sample stabilizer tube prior to assembly of the sample vessel. In particular, a first part of the adaptor can be configured to include a first part of the fluid channel that is configured to fluidly seal the sample tube and prevent the biological sample from leaking where the sample tube is not configured to prevent leaks of the biological sample. Additionally, a second part of the adaptor can be configured similar to the adaptors described above by FIG. 1, FIG. 2, and FIG. 3. Further, the first part and the second part can be configured to couple with the sample tube via a sample tube interface (e.g., the sample tube interface 116) and an insert (e.g., the insert 112), respectively. The first part and the second part can also be configured to couple and form the fluid channel such that the biological sample can mix with the stabilizer.

At block 508, the sample tube and the sample stabilizer tube can be utilized to form a sample vessel that contains the biological sample and the stabilizer. As noted above, the adaptor can be configured to join the sample tube and the sample stabilizing tube such that the sample vessel is formed. The sample vessel can be a substantially sealed container that secures the biological sample in fluid communication with the stabilizer via at least the fluid channel. Additionally, the sample vessel can be sealed to maintain the viability of the biological sample and the stabilizer independent of the ambient environment surrounding the sample vessel. The sample vessel can be formed via a fastening mechanism that secures the sample tube in fluid communication with the sample stabilizing tube. The fastening mechanism can utilize screw threads that enable the sample tube to be screwed into the adaptor, a clamp that locks the sample tube into the adaptor, one or more fasteners (e.g., screws, bolts, wing nuts, etc.) that combine the sample tube with adaptor, and/or other fastening mechanisms. Further, the fastening mechanism can include an indicator that alerts the patient (or other individual) when the sample tube and the sample stabilizer tube have been successfully combined. For example, a stopper can emit an audible click when the sample tube has been sufficiently screwed into the adaptor such that a substantially fluid tight seal is formed, and the stopper can prevent the sample tube from being unintentionally removed from the adaptor.

At block 510, the sample vessel can be agitated such that the biological sample is transferred to the sample stabilizing tube from the sample tube. For example, the sample vessel can be manually shaken by the patient, vibrated by a motor or other mechanical oscillator, and/or otherwise receive a force that dislodges the biological sample from the sample tube and causes the biological sample to be directed into the sample stabilizer tube.

At block 512, a stabilized sample can be created within the sample stabilizing tube due to the first amount of the biological sample mixing with the second amount of the stabilizer.

Figure 6:
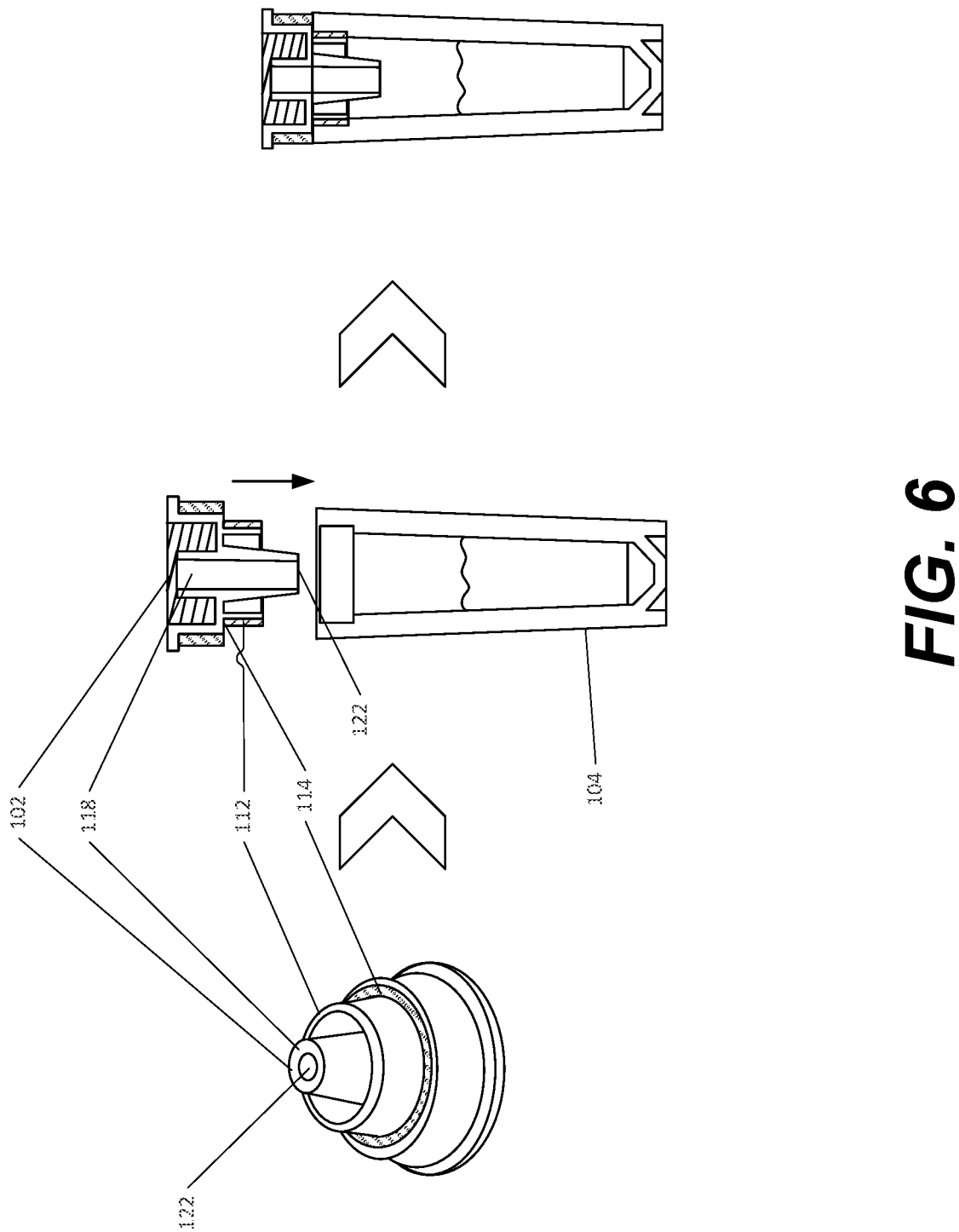
FIG. 6 illustrates a diagram for assembling a sample stabilizing tube from an adaptor and a reagent vial that substantially contains a stabilizer within an internal volume of the sample stabilizing tube.

FIG. 6 illustrates a diagram for assembling a sample stabilizing tube from an adaptor and a reagent vial that substantially contains a stabilizer within an internal volume of the sample stabilizing tube.

In some particular implementations, the sample stabilizing tube enables the self-collection of blood and immediate stabilization of RNA and/or other biological samples, an ability that opens new opportunities to probe time- and location-specific stimuli outside of traditional venipuncture collection limitations. The two main components of that enable the collection of biological samples include a sample collection device, such as a Tasso-SST™ (e.g., a system that collects approximately 100-500 µL of blood from the upper arm and deposits the blood in a sample tube) and a sample stabilizing tube that is designed to screw onto the sample tube from the sample collection device. The freshly drawn blood is stabilized by combining the sample tube with the adaptor 102 that is connected to the reagent vial 104 via the insert 112 and the sealing surface 114. Additionally, the sample tube containing the blood can be detached from the sample collection device and screwed tightly onto the sample stabilizer tube due to the sample tube interface being a duplicate of the interface between the sample collection device and the sample tube. Accordingly, the sample tube can be coupled to the adaptor 102, placed in fluid communication with the sample stabilizer tube via the fluid channel 118, and shaken to mix the blood with the stabilizer. The stabilized blood sample can then be packaged and mailed back to the lab for analysis.

In some particular implementations, the sample stabilizer tube is formed by a combination of the adaptor 102 and the reagent vial 104. In particular, an adhesive substance, such as a UV curing epoxy can be applied to the sealing surface 114 and utilized to combine the adaptor and the reagent vial, substantially permanently, to form the sample stabilizer tube. Accordingly, the sample stabilizer tube is configured to couple specifically with the sample tube due to the incorporated interface that is duplicated from the sample collection device to ensure that the sample tube is received and secured by the adaptor to form the sample vessel. Further, the assembly of the sample stabilizer tube enables a plurality of adaptors being interchangeable, enabling rapid adoption of novel sample collection devices as the sample stabilizing tubes can utilize a single reagent vial that is couple to the appropriate adaptor during assembly.

Experimental Example

A homeRNA kit can enable the self-collection of blood and immediate stabilization of RNA, an ability that opens new opportunities to probe immune responses to time- and location-specific stimuli outside of traditional venipuncture collection. The two main components of the homeRNA kit include a sample collection device, the Tasso-SST™, which collects approximately 100-500 µL of blood from the upper arm and a sample stabilizer tube, designed to screw onto the detachable sample tube from the Tasso-SST™ device. FIG. 5 summarizes the general workflow for collection and stabilization using the homeRNA kit. To operate the Tasso-SST™, the sample collection device is first applied to the upper arm, where it is held in place by an adhesive. The user then presses an activator button deploying a lancet that quickly punctures the skin. Blood is then drawn into the sample tube, which holds up to approximately 500 µL of blood. To stabilize the freshly drawn blood, the sample tube containing the blood is detached from the Tasso-SST™ device and screwed tightly onto the sample stabilizer tube, and the sample vessel formed from the sample tube and the sample stabilizer tube are shaken to thoroughly mix the blood with the stabilizer. The stabilized blood sample is then packaged and mailed back to the lab for analysis.

The Tasso-SST™ can be utilized for blood collection due to the Tasso-SST™ enabling self-administered biological samples to be collected, the general ease of use, and the larger blood volume (>100 µL) drawn when compared to other sample collection devices, making the Tasso-SST™ suitable for applications requiring a greater amount of starting material (e.g., RNA sequencing (RNAseq)). Compared to other blood collection methods, users report lower pain thresholds when using the Tasso-SST™ or similar devices that collect from the upper arm. The authors note that the serum separator tube (SST) gel (included in the Tasso-SST™ collection tube) is not necessary for RNA stabilization and analysis. In fact, a device or tube containing EDTA or another anticoagulant would be preferable to prevent clotting, and we note varying degrees of clotting observed in our returned samples. At the time of the study, the Tasso-SST™ was available for purchase. Therefore, it was chosen as the device to use as an initial proof of concept for demonstrating remote blood collection and RNA stabilization.

Design of the Sample Stabilizer Tube

Design considerations for the sample stabilizer tube include preventing exposure of the stabilizer solution and preventing leaking or splashing when the blood and stabilizer solution are mixed. The design parameters can enable individuals to collect biological samples at home, the design parameters assist the systems and devices to contain the blood sample and stabilizer solution within the tubes throughout the stabilization process. To address these design considerations, a spill resistant stabilizer tube opening is utilized to mitigate user exposure and is configured to form a substantially fluid tight seal with the Tasso-SST™ to prevent leaking or splashing while mixing. Because of the small volume and shape (i.e., long and skinny) of the Tasso-SST™ sample tube, the blood sample remains in the sample tube even when it is inverted due to surface tension. This observation, combined with a no-spill cone feature in the sample stabilizer tube allowed the user to easily tip the tubes sideways to connect them without causing either liquid (the stabilizer or the blood sample) to spill. However, surface tension of the blood sample may cause the blood sample to remain in the Tasso-SST™ sample tube. Accordingly, to be stabilized, the blood is mixed with the stabilizer liquid in the sample stabilizer tube via shaking and/or agitating a combined system of the sample tube and the sample stabilizer tube to break the surface tension and cause the two liquid interfaces (the blood and the stabilizer) to come into contact. Because this mechanism for mixing may utilize vigorous shaking across the sample tube and the sample stabilizer tube attachment point, a substantially fluid tight seal is formed via the adaptor. Leaking could also happen during the sample's return if the seal was inadequate. To achieve a tight seal, the sample tube interface of the adaptor that attaches to the Tasso-SST™ sample tube is fabricated based at least on a cap and/or the sample tube associated with the Tasso-SST™.

Surface tension was also utilized to design the opening of the sample stabilizer tube to achieve the design consideration of substantially preventing exposure to the stabilizer. The sample stabilizer tube was engineered with a fluidic cone-shaped channel at the connection point between the sample stabilizer tube and the Tasso-SST™ sample tube. This fluidic cone takes advantage of surface tension to create a valve such that the stabilizer solution remains in the stabilizer tube when the tube is inverted. The design of the sample stabilizer tube can utilize variable widths of the opening at the bottom of the cone channel feature to permit easier mixing of the blood sample with the stabilizer. Tubes utilizing variable width bottom openings were used by at least two groups of participants.

One or more components that comprise the sample stabilizer tube (reagent vial, adaptor, and protective lid) were injection molded out of the same material (polycarbonate), to account for consistent material shrinkage during the injection molding process. Polycarbonate is commonly used in biological laboratory consumables and is known to be inert to most biological samples and reagents. Due to the nature of the injection molding process required for the adaptor piece (which included an internal thread feature), polystyrene and polypropylene, other commonly used materials in laboratory consumables, could not be used.

Stabilization of Blood Using RNAlater™ Resulted in Higher RNA Yield and Quality Compared to Other Stabilizers Over Broad Storage Conditions Three RNA stabilizers may be commonly used in gene expression studies (Tempus™ PAXgene®, or RNAlater™) for both yield and quality of the total RNA isolated from stabilized blood samples over broad storage conditions. Both Tempus™ and PAXgene® are often used in blood gene expression studies due to the commercial availability of these stabilizers in vacutainer tubes allowing for a direct draw of venous blood into the stabilizers. In contrast, RNAlater™ is widely used to stabilize transcripts in laboratory specimens and extracted tissues but not commonly used in blood gene expression studies due to the lack of commercially available RNAlater™ vacutainer tubes. However, since any RNA stabilizer can be put in the stabilizer tube in the homeRNA kits, all three common stabilizers can be utilized for preserving transcripts from blood. The three stabilizers can be utilized to stabilize the blood sample for both storage temperature and length, the two major variables that may affect post-collection RNA yield and post-collection RNA quality as indicated by an RNA integrity number (RIN) obtained via a Bioanalyzer 2100 or similar device. The RIN value can be determined based on an algorithm that analyzes an electrophoretogram obtained from capillary electrophoresis. RIN values range from 1-10, where 10 represents entirely intact and non-degraded RNA.

Preliminary experiments showed that blood stabilized in RNAlater™ offered comparable total RNA yield and highest RIN values (yield=4.9 µg RIN=8.4) compared to both Tempus™ (yield=5.1 µg RIN=7.1) and PAXgene® (yield not detected, RIN=1.0) after 7 days of storage at ambient temperature (FIG. S5). Given these preliminary results, both RNAlater™ and Tempus™ were assessed further for performance at a broader range of storage temperatures. Stabilization of blood using RNAlater™ can yield improved RIN values at higher temperatures compared to Tempus™. These parameters could be experienced with remote user-administered sampling methodologies. Furthermore, the lack of corrosive (tartaric acid) and toxic (guanidine hydrochloride) stabilizing chemicals in RNAlater™ makes it an attractive choice for home-use or user-administered procedures. Due to high observed efficacy in stabilization for variable time and temperature profiles in our initial in-lab testing, coupled with user safety considerations, we chose to incorporate RNAlater™ into the homeRNA stabilizer tubes to accomplish stabilization of peripheral blood drawn with the Tasso-SST™ in the pilot study.

Analysis of Whole-Blood RNA Returned from the homeRNA Kit Reveals Feasibility for Disseminated Whole Blood Sampling and RNA Stabilization A plurality of participants enrolled in a pilot feasibility and usability study demonstrated self-blood collection and RNA stabilization outside of a clinical or research setting. homeRNA kits were mailed to a residence of a participant where blood samples were collected, stabilized, and returned based solely on provided instructions in the kits and an instructional video. Stabilized samples were returned to the laboratory for analysis via mail. Therefore, the stabilized samples were tested to determine whether the stabilized samples remained stable throughout the shipping and the variability of temperature, pressure changes, and other mechanical stress inflicted during shipping.

Upon returning to the lab, total RNA was extracted from all stabilized blood samples and assessed for yield and quality (RIN values). 83% and 100% (n=60 total samples) of blood samples returned from the pilot study offered a total RNA yield greater than 500 ng (e.g., a comfortable minimal cut-off value for large-scale transcriptomics analyses) and 100 ng (e.g., a comfortable minimal cut-off value for expression analyses of a small panel of targeted genes), respectively. The above cut-off values for total yield were obtained immediately after extraction and may vary across studies depending on the choice of analysis methods (e.g., RT-PCR, digital droplet PCR, RNAseq, xMAP® and nCounter® technologies) and pre-analysis sample processing steps (e.g., globin depletion, RNA species enrichments) that will incur further yield losses. Based on the pilot study data, all self-drawn and self-stabilized peripheral blood samples using the homeRNA blood kit offered sufficient yield for targeted small gene panel profiling. A significant portion (83%, n=50/60) also included sufficient yield for genome-wide transcriptional profiling analysis methods such as RNAseq.

RIN values were obtained for 85% of all isolated RNA (n=51/60) samples (FIG. 3B). It should be noted that the 15% (n=9/60) of samples that were not scorable and did not afford a RIN value were associated with low total yield, resulting in low RNA concentrations in the 15% of samples. For samples that did not afford RIN values, a visual inspection of the digital gel images of these samples showed 78% (n=7/9) contain intact ribosomal RNA bands depicting good RNA integrity. RIN values of all scorable RNA samples range between 6.8-9.6, with 53% (n=27/51) of samples affording RIN values greater than or equal to 8.0 and all but one of the samples greater than 7.0 (n=50/51) (FIG. 3B). Similar to the minimum cut-off value for yield, RIN values and their suitability for downstream gene expression analyses vary widely based on the source of the tissue or sample from where the RNA is isolated. For example, formalin-fixed paraformaldehyde embedded (FFPE) tissues and tissues containing high levels of ribonucleases (e.g., blood, liver, spleen, and kidney tissues) often afford lower RIN values due to the high degradation potential in these tissue types. A RIN value of 7.0 is a typical minimal cut-off value for RNAseq applications.17, 28 For highly degraded samples such as FFPE tissues that often have RIN values as low as 2.0, the fragment size distribution index (DV200) is frequently used to assess RNA quality and determine sample suitability for downstream gene expression analyses. Further, as there is interest in using RNAseq for lower yield or degraded samples (such as FFPE), there are many published techniques on methods to accomplish RNAseq in degraded samples.28-30 Despite whole blood being rich in ribonucleases, the remote self-collection and stabilization process of the homeRNA blood kit still afforded high RIN values (RIN>7.0) that, by themselves, render these samples suitable for a variety of gene expression analysis. Therefore, a DV200 index assessment was not necessary for assessment of these samples. The yield and quality of the RNA extracted from blood samples from our pilot study are well within the parameters for targeted small gene panel profiling, and many of the samples even reach the higher thresholds set by sequencing facilities, conferring the convenience of outsourcing RNAseq for researchers interested in using our homeRNA kit for their own out-of-clinic transcriptomics studies. Importantly, when compared to emerging remote self-sampling methodologies such as dried blood spotting, the homeRNA collection process affords a better yield and quality that allows for a broader range of flexibility in analysis methodologies.

Despite sufficient yield and high RIN values observed for the RNA samples isolated from the homeRNA stabilized blood, presence of other residual chemical impurities that may have been introduced during the assembly process (e.g., the epoxy used for bonding) may affect downstream gene expression analyses. Thus, to further assess whether RNA isolated from homeRNA-blood samples are compatible with downstream gene expression analyses protocols, expression of two reference genes (GAPDH and UBIC) were measured from isolated RNA samples (n=23) using digital droplet PCR (ddPCR). ddPCR was chosen as an analysis method based at least on a high protocol similarity to commonly used RT-PCR methods coupled with additional protocol requirements of maintaining droplet stability upon droplet generation. Select RNA samples with yield (0.63-5.44 µg) and RIN values (7.1-9.6) used for ddPCR analysis broadly represent the range of values for each of the two parameters observed within our pilot study. The mean values of total accepted droplets (TAD) for both GAPDH (TAD=16,203; n=23) and UBIC (TAD=16,693; n=22) reactions are comparable to that of the no-template control (NTC) (TAD=16, 741; n=4), suggesting droplet stability is maintained throughout the amplification process. Both GAPDH and UBIC depicted mean (SD) values of $4.1\times10^3$ ($1.9\times10^3$) and $3.7\times10^3$ ($1.6\times10^3$) copies/ng RNA-equivalent cDNA respectively. The variation in observed copies can be attributed to biological variations in GAPDH and UBI gene expression within the study participants. Taken together, RNA yield, quality, and gene expression results obtained from homeRNA blood RNA samples demonstrated successful preservation and expression analysis of blood mRNA transcripts from this user-operated home sampling methodology. Future studies on the use of the homeRNA decentralized blood collection and stabilization technology to capture dynamic changes of immune responses to a variety of environmental stimuli and diseases will be of utmost interest to our group and the broader community.

Kit Performance is Robust Across Participant Demography and Mailing Groups.

To assess the geographic distribution feasibility of this remote-sampling methodology, homeRNA blood kits were mailed from a laboratory facility in Seattle, Wash. to various residential destinations in the West Coast, Midwest, and East Coast of the United States. Additionally, we mailed homeRNA to various residential housing types in urban, suburban, and rural areas, including single-family unit houses and large multi-family apartment complexes (where packages are typically held in the lobby or mailroom). Demonstrating sampling from rural areas is important to expand research in places where participants traditionally needed to travel to phlebotomy labs located in other towns or cities. Such expansion would enable research into immune events that may be more commonly triggered in rural populations, such as exposure to agricultural chemicals or wildfires.

homeRNA kits were sent out in seven independent mailing groups from May to December 2020. Most kits were returned within 1-3 days after sample collection, but some kits were returned later, with one being returned as late as 15 days after collection. Notably, this sample still yielded an RNA yield of 0.56 µg and a RIN value of 7.8, so even with over a two-week delay, where the sample was in the mail, we recovered enough intact RNA for downstream analyses. From a usability perspective, differences between groups in terms of total RNA yield and RIN values were minimal, suggesting robustness to the remote sampling methodology afforded by the homeRNA kit; slight variations in the instructions (e.g., changes in wording, updated graphics, the inclusion of an instructional video) did not dramatically change results, suggesting the kit itself was relatively simple and intuitive to use. Finally, the RNA quality analysis parameters (total RNA yield and RIN values) were not significantly different across a range of age group, gender, or body mass index (BMI). Reported blood levels, utilized as an approximation for volume collected, also were not different between different ages, genders, or BMI, indicating consistency in blood collection with the Tasso SST™ regardless of participant demographic or BMI. While we demonstrated robustness across these parameters, we note that the pilot study did not collect information on participants' socioeconomic status or level of education. For future studies, we intend to evaluate the usability of the homeRNA kit across a more diverse population and in geographical regions or during seasons that can incur more considerable variations in the high/low ambient temperatures.

Participant Survey Responses Indicate Good Usability of homeRNA

Ease of use and participant perception is utilized to facility compliance, particularly for using this method in future longitudinal (multi-sample) studies. Usability was assessed through a user experience survey that the participants were asked to complete after using the kits. This survey was also used as a mechanism for feedback from the participants in order to iterate upon the instructions and kit components. Perception of the kits in terms of the time it takes to complete it, ease of use, and pain or discomfort were assessed. Metrics for measuring the performance of the kit were also assessed, including asking the participants to estimate how much blood was collected and the time the Tasso-SST™ was left on the arm, as an approximation for the blood collection time.

Participants that successfully collected blood using the Tasso-SST™ commonly completed the collection of the blood sample in less than 10 minutes (69%, n=29/42). Nearly all participants (93%, n=39/42) reported either minimal pain or discomfort or no pain or discomfort while using the Tasso-SST™, and the majority (52%, n=22/42) reported no pain or discomfort. Only 3 participants found the pain or discomfort to be rated as moderate (n=2) or major (n=1). Regarding the participant's perception of how easy the kits were to use, most of the participants reported the Tasso-SST™ and stabilizer tube to be easy to use or somewhat easy to use (76%, n=35/46 and 79%, n=36/42 for the Tasso-SST™ and sample stabilizer tube respectively). Participants with close proximity to the project were excluded from this analysis; participants who failed to collect blood were excluded from the pain and stabilizer tube usability but were included in the usability for the Tasso-SST™ (4 out of 47 total enrollment). In summary, feedback with regards to the pain experienced and usability was positive.

Participant Survey Responses on Device Performance Show Sufficient Yield Even at a Low Sample Volume To assess the possible correlation between estimated blood collection volume and total RNA yield, participants were asked to estimate the levels of blood drawn into the Tasso-SST™ blood collection tube based on a provided blood tube image (depicted in FIG. 5Aii). Estimated volumes for the four levels are as follow: Level 1=100 µL, Level 2=200 µL, Level 3=300 µL and Level 4>400 µL. The majority of the participants reported blood collection at Level 4 (52% n=34/65). While there are very few samples at lower reported blood levels (Level 1 and 2), there does not appear to be a strong correlation between blood level reported and yield. This could be due to inaccuracies in reporting by participants, individual variability in RNA yield, or loss during the sample processing or blood clotting in the stabilizer tube. Notably, participants who reported collecting a low volume (Level 1 ~100 µL) of blood still had RNA yields >100 ng, with one sample as high as 2.85 µg. In short, all collections, irrespective of reported collection levels, afforded RNA yield sufficient for downstream gene expression analyses.

EXAMPLE CLAUSES

The following clauses recite various implementations of the present disclosure:

1. A system comprising: a biological sample container that receives a blood sample from a sample collection device, the biological sample container being removably couplable with the sample collection device and configured to store the blood sample; a stabilizer container that contains a liquid stabilizer configured to stabilize an analyte from the blood sample for transport to a collection facility, the stabilizer container having an internal volume that is greater than a volume of the liquid stabilizer and comprising a container wall that partially encloses the internal volume; an adaptor that couples to the biological sample container via a sample container interface and to the stabilizer container via an insert, the insert adhering to the container wall at a stabilizer vial opening, the sample container interface matching a geometry of a biological sample container port of the sample collection device; and a fluid channel that extends from a first opening of the biological sample container to a second opening of the stabilizer vial and fluidly connects the first opening with the second opening.

2. The system of claim 1, further comprising a biological sample stabilizer container comprising the adaptor inserted into the stabilizer vial, the biological sample stabilizer container comprising the internal volume in fluid communication with the fluid channel, the fluid channel being configured to substantially prevent the liquid stabilizer from exiting the internal volume of the stabilizer vial when the liquid stabilizer is subjected to a hydrostatic force.

3. The system of claim 2, further comprising a protective lid coupled with the sample container interface of the biological sample stabilizer container, the protective lid preventing one or more contaminants from entering the internal volume via the fluid channel.

4. The system of claim 1, further comprising a biological sample vessel comprising the biological sample container, the stabilizer vial, and the adaptor, the fluid channel fluidly connecting the internal volume of the stabilizer vial with the biological sample container.

5. The system of claim 4, wherein the fluid channel is configured to transfer the blood sample from the biological sample container to the stabilizer vial and the liquid stabilizer from the stabilizer vial to the biological sample container when a force is manually applied to the biological sample vessel.

6. A system comprising: a reagent container configured to contain a first amount of a first reagent; an adaptor secured to the reagent container and configured to substantially prevent the first amount of the first reagent from exiting the reagent container via the adaptor under hydrostatic forces such that the reagent container is substantially sealed; and a fluid channel that extends through the adaptor and is fluidly connected with the reagent container, the fluid channel configured such that the first amount of the first reagent is extractable via the fluid channel and a second amount of a second reagent.

7. The system of claim 6, wherein: the reagent container is a first reagent container; a second reagent container is configured to receive and store the second amount of the second reagent; and the adaptor is configured to secure the second reagent container to the first reagent container such that the first amount of the first reagent and the second amount of the second reagent are mixed.

8. The system of claim 7, wherein: the fluid channel includes a first opening and a second opening; the first opening is associated with the first reagent container and is configured to substantially prevent the first amount of the first reagent from exiting the first reagent container; and the second opening is associated with the second reagent container such that the second amount of the second reagent is mixed with the first amount of the first reagent.

9. The system of claim 8, wherein: a first diameter of the first opening is less than a second diameter of the second opening; and the second reagent flows into the first reagent container through the first opening and the fluid channel.

10. The system of claim 9, further comprising: a pipette configured to extract a mixture of the first reagent and the second reagent from the first reagent container, a third diameter of the pipette being less than the first diameter, wherein a first diameter of the first opening is equal to a second diameter of a second opening.

11. The system of claim 7, wherein the adaptor further comprises: an insert that is configured to attach to the first reagent container such that the fluid channel substantially prevents the first reagent from leaking out of the first reagent container; and a container interface that is configured to removably couple with the second reagent container.

12. The system of claim 11, wherein: the container interface is a structural negative of an opening of the second reagent container; the opening of the second reagent container comprises one or more securing threads and the container interface comprises one or more additional threads that match the one or more securing threads; and the one or more securing threads couple to the one or more additional threads.

13. The system of claim 6, wherein the fluid channel, the reagent container, and the adaptor are comprised of a material, the material associated with a contact angle of the reagent and the material preventing the reagent from traversing the fluid channel under hydrostatic pressure.

14. The system of claim 6, wherein: the fluid channel comprises a first material, the reagent container and the adaptor comprise a second material that is different from the first material; and the first material is a coating on the fluid channel, the coating being configured to prevent the reagent from traversing the fluid channel under hydrostatic pressure.

15. The system of claim 6, further comprising a protective lid coupled to the adaptor and the reagent container.

16. A method comprising: attaching, by an adaptor of a first reagent container that contains a first amount of a first reagent, to a second reagent container that contains a second amount of a second reagent; forming, by the adaptor of the first reagent container, a reagent vessel that comprises a fluid-tight seal between the first reagent container and the second reagent container; and receiving an agitating force that generates a mixture of the first reagent and the second reagent in the first reagent container and the second reagent container.

17. The method of claim 16, wherein the fluid-tight seal between the first reagent container and the second reagent container is stable under a pressure gradient during air transportation.

18. The method of claim 16, wherein the fluid-tight seal between the first reagent container and the second reagent container is stable under elevated temperatures.

19. The method of claim 16, wherein receiving the agitating force comprises applying the agitating force to the reagent vessel such that the second reagent is removed from the second reagent container and provided to the first reagent container via the adaptor.

20. The method of claim 16, wherein receiving the agitating force causes a fluid channel to transfer the second reagent from the second reagent container to the first reagent container and the first reagent from the first reagent container to the second reagent container

CONCLUSION

The above described systems and methods enable researchers and medical practitioners to acquire biological samples independently of clinic-based collection methods that have previously limited patient treatment and access to research subjects. The flexibility of the sampling system and increased sample volume/viability compared to current remote sample collection methods. Additionally, utilization of a sample collecting device and stabilizing vessels to remotely collect biological samples enables multiple samples to be obtained from the same individual outside of an in-patient setting more readily than with existing methods. Further, the ease of use of the described system enables the ability to sample virtually everywhere, execute studies into individualized patient responses without disturbing and/or inconveniencing the patient, and to reach patients and individuals that would otherwise struggle to submit biological samples for testing. Accordingly, the utilization of sample vessels to stabilize biological samples enables disseminated diagnostics, therapeutics, and clinical research into lower resource or rural settings, which are often far from standard facilities for collecting biological samples.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be used for realizing implementations of the disclosure in diverse forms thereof.

As will be understood by one of ordinary skill in the art, each implementation disclosed herein can comprise, consist essentially of or consist of its particular stated element, step, or component. Thus, the terms "include" or "including" should be interpreted to recite: "comprise, consist of, or consist essentially of." The transition term "comprise" or "comprises" means has, but is not limited to, and allows for the inclusion of unspecified elements, steps, ingredients, or components, even in major amounts. The transitional phrase "consisting of" excludes any element, step, ingredient or component not specified. The transition phrase "consisting essentially of" limits the scope of the implementation to the specified elements, steps, ingredients or components and to those that do not materially affect the implementation. As used herein, the term "based on" is equivalent to "based at least partly on," unless otherwise specified.

Unless otherwise indicated, all numbers expressing quantities, properties, conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. When further clarity is required, the term "about" has the meaning reasonably ascribed to it by a person skilled in the art when used in conjunction with a stated numerical value or range, i.e. denoting somewhat more or somewhat less than the stated value or range, to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing implementations (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate implementations of the disclosure and does not pose a limitation on the scope of the disclosure. No language in the specification should be construed as indicating any non-claimed element essential to the practice of implementations of the disclosure.

Groupings of alternative elements or implementations disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, the practice of the present disclosure can employ conventional techniques of immunology, molecular biology, microbiology, cell biology and recombinant DNA. These methods are described in the following publications. See, e.g., Sambrook, et al. Molecular Cloning: A Laboratory Manual, 2nd Edition (1989); F. M. Ausubel, et al. eds., Current Protocols in Molecular Biology, (1987); the series Methods IN Enzymology (Academic Press, Inc.); M. MacPherson, et al., PCR: A Practical Approach, IRL Press at Oxford University Press (1991); MacPherson et al., eds. PCR 2: Practical Approach, (1995); Harlow and Lane, eds. Antibodies, A Laboratory Manual, (1988); and R. I. Freshney, ed. Animal Cell Culture (1987).

Certain implementations are described herein, including the best mode known to the inventors for carrying out implementations of the disclosure. Of course, variations on these described implementations will become apparent to those of ordinary skill in the art upon reading the foregoing description. The inventor expects skilled artisans to employ such variations as appropriate, and the inventors intend for implementations to be practiced otherwise than specifically described herein. Accordingly, the scope of this disclosure includes all modifications and equivalents of the subject matter recited in the claims appended hereto as permitted by applicable law. Moreover, any combination of the above-described elements in all possible variations thereof is encompassed by implementations of the disclosure unless otherwise indicated herein or otherwise clearly contradicted by context.

We claim:

1. A system comprising:
a reagent container configured to contain a first amount of a first reagent;
an adaptor secured to the reagent container and configured to substantially prevent the first amount of the first reagent from exiting the reagent container via the adaptor under hydrostatic forces such that the reagent container is substantially sealed; and
a fluid channel that extends through the adaptor and is fluidly connected with the reagent container, the fluid channel configured such that the first amount of the first reagent is extractable via the fluid channel and a second amount of a second reagent is provided via the fluid channel.

2. The system of claim 1, wherein:
the reagent container is a first reagent container;
a second reagent container is configured to receive and store the second amount of the second reagent; and
the adaptor is configured to secure the second reagent container to the first reagent container such that the first amount of the first reagent and the second amount of the second reagent are mixed.

3. The system of claim 2, wherein:
the fluid channel includes a first opening and a second opening;
the first opening is associated with the first reagent container and is configured to substantially prevent the first amount of the first reagent from exiting the first reagent container; and
the second opening is associated with the second reagent container such that the second amount of the second reagent is mixed with the first amount of the first reagent.

4. The system of claim 3, wherein:
a first diameter of the first opening is less than a second diameter of the second opening; and
the second reagent flows into the first reagent container through the first opening and the fluid channel.

5. The system of claim 4, further comprising:
a pipette configured to extract a mixture of the first reagent and the second reagent from the first reagent container, a third diameter of the pipette being less than the first diameter,
wherein a first diameter of the first opening is equal to a second diameter of a second opening.

6. The system of claim 2, wherein the adaptor further comprises:
an insert that is configured to attach to the first reagent container such that the fluid channel substantially prevents the first reagent from leaking out of the first reagent container; and
a container interface that is configured to removably couple with the second reagent container.

7. The system of claim 6, wherein:
the container interface is a structural negative of an opening of the second reagent container;
the opening of the second reagent container comprises one or more securing threads and the container interface comprises one or more additional threads that match the one or more securing threads; and
the one or more securing threads couple to the one or more additional threads.

8. The system of claim 1, wherein the fluid channel, the reagent container, and the adaptor are comprised of a material, the material associated with a contact angle of the reagent and the material preventing the reagent from traversing the fluid channel under hydrostatic pressure.

9. The system of claim 1, wherein:
the fluid channel comprises a first material, the reagent container and the adaptor comprise a second material that is different from the first material; and
the first material is a coating on the fluid channel, the coating being configured to prevent the reagent from traversing the fluid channel under hydrostatic pressure.

10. The system of claim 1, further comprising a protective lid coupled to the adaptor and the reagent container.

* * * * *